(12) United States Patent
Evens et al.

(10) Patent No.: US 10,216,237 B2
(45) Date of Patent: Feb. 26, 2019

(54) SYSTEM AND METHOD FOR THERMAL MANAGEMENT GUIDANCE

(71) Applicant: The Boeing Company, Chicago, IL (US)

(72) Inventors: Michael W. Evens, Burien, WA (US); Joseph Lawrence Hafenrichter, Seattle, WA (US); Joel Patrick Baldwin, Seattle, WA (US); Ronald G. Turner, Arlington, WA (US); Megan N. Watson, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/722,793

(22) Filed: Oct. 2, 2017

(65) Prior Publication Data
US 2018/0024601 A1    Jan. 25, 2018

Related U.S. Application Data

(62) Division of application No. 13/739,249, filed on Jan. 11, 2013, now Pat. No. 9,817,452.

(51) Int. Cl.
*G06F 1/20*      (2006.01)
*B29C 73/12*    (2006.01)
(Continued)

(52) U.S. Cl.
CPC .............. *G06F 1/206* (2013.01); *B29C 73/12* (2013.01); *B29C 73/30* (2013.01); *B29C 73/34* (2013.01); *B64F 5/40* (2017.01); *B29C 73/10* (2013.01)

(58) Field of Classification Search
CPC combination set(s) only.
See application file for complete search history.

(56) References Cited

U.S. PATENT DOCUMENTS 6,026,881 A    2/2000 Durso
6,174,392 B1    1/2001 Reis
(Continued)

FOREIGN PATENT DOCUMENTS

CN    1361039    7/2002
CN    101678606    3/2010
(Continued)

OTHER PUBLICATIONS

PCT/US2013/060737 International Search Report and the Written Opinion dated May 14, 2014.
(Continued)

*Primary Examiner* — Lisa Caputo
*Assistant Examiner* — Nasir U Ahmed
(74) *Attorney, Agent, or Firm* — Kunzler, PC

(57) ABSTRACT

The present disclosure describes one or more systems, methods, routines and/or techniques for thermal management. One or more systems, methods, routines and/or techniques may provide advice or guidance (e.g., to a repair technician) regarding how to perform a hot bond repair, for example, on an aircraft component that has been damaged. The thermal management advisor may provide advice or guidance regarding how to prepare a repair field prior to running a thermal survey. For example, thermal management advisor may recommend a particular heat blanket, a configuration of the heat blanket, placement of various temperature sensors and other preparation guidance. The thermal management advisor may provide advice or guidance regarding how to alter or manage the repair setup during a thermal survey and during the actual curing process. For example, thermal management advisor may recommend particular temperature sensors or areas of the repair field that should be insulated.

20 Claims, 23 Drawing Sheets

(51) Int. Cl.
B29C 73/30 (2006.01)
B29C 73/34 (2006.01)
B64F 5/40 (2017.01)
B29C 73/10 (2006.01)

(56) References Cited

U.S. PATENT DOCUMENTS

| | | |
|---|---|---|
| 2007/0091174 A1 | 4/2007 | Kochi et al. |
| 2008/0281554 A1 | 11/2008 | Cork et al. |
| 2010/0024185 A1* | 2/2010 | Mayabb ............... B29C 73/04 29/402.03 |
| 2012/0080135 A1 | 4/2012 | Evens et al. |
| 2013/0026231 A1 | 1/2013 | Rouchouze et al. |
| 2013/0037198 A1 | 2/2013 | Safai et al. |

FOREIGN PATENT DOCUMENTS

| | | |
|---|---|---|
| CN | 102187286 | 9/2011 |
| CN | 102317060 | 1/2012 |
| DE | 102004062064 A1 | 7/2006 |
| JP | 2005271247 | 10/2005 |
| JP | 2009137578 | 6/2009 |
| JP | 2010137527 | 6/2010 |
| JP | 2013006591 | 1/2013 |
| KR | 1010120112385 | 10/2012 |
| WO | 2010080596 | 7/2010 |
| WO | 2012113742 | 8/2012 |
| WO | 2012154544 A2 | 11/2012 |

OTHER PUBLICATIONS

Candadian Office Action for Canadian Patent Application No. 2,896,487 dated Jun. 28, 2016.
Canadian Office Action for Canadian Patent Application No. 2,896,487 dated May 29, 2017.
Office Action for Japanese Patent Application No. 2015-552624 dated Jun. 27, 2017.
Korean Office Action concerning Korean Patent Application No. 10-2015-7020422 dated Sep. 18, 2018.

* cited by examiner

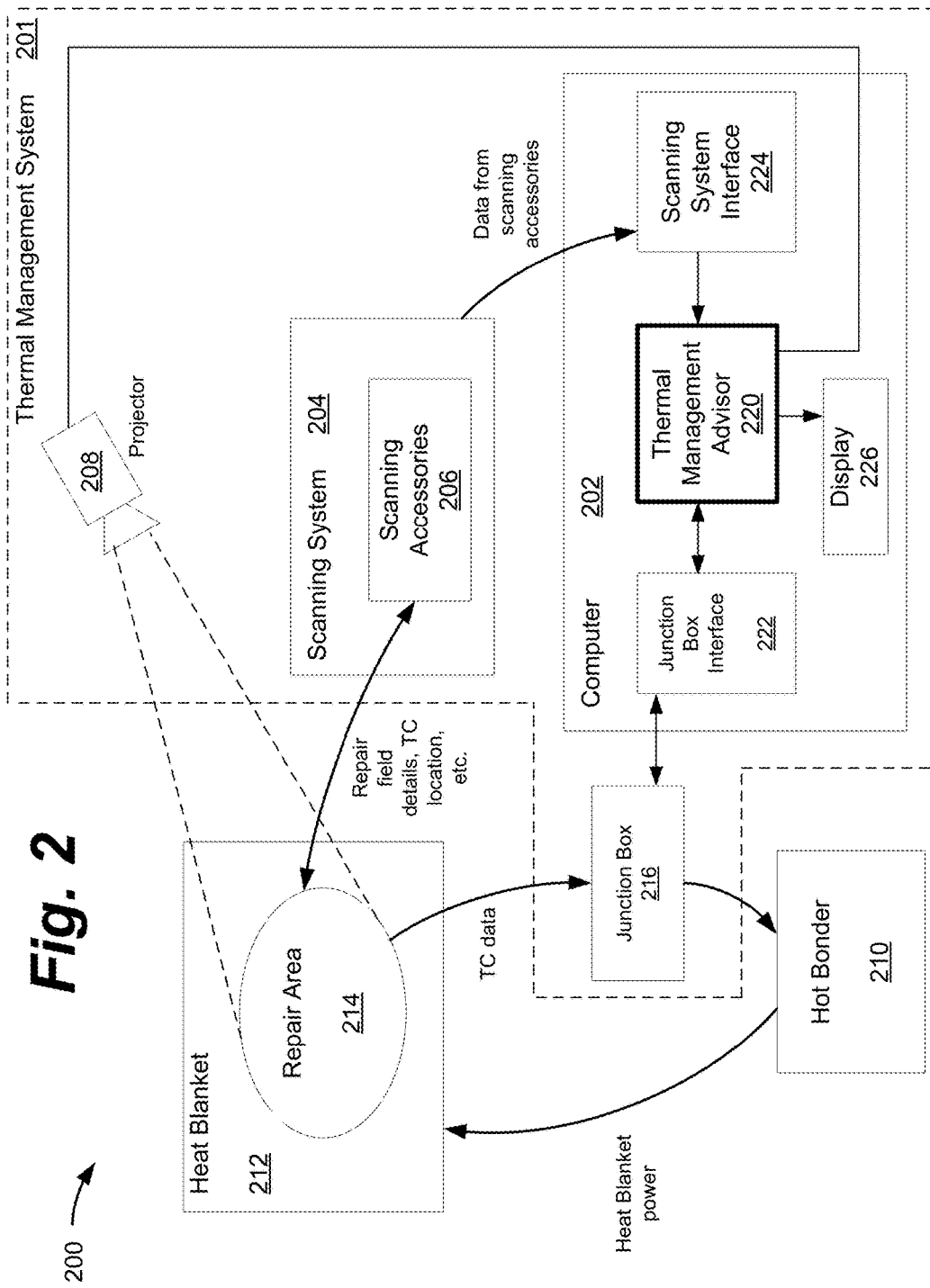

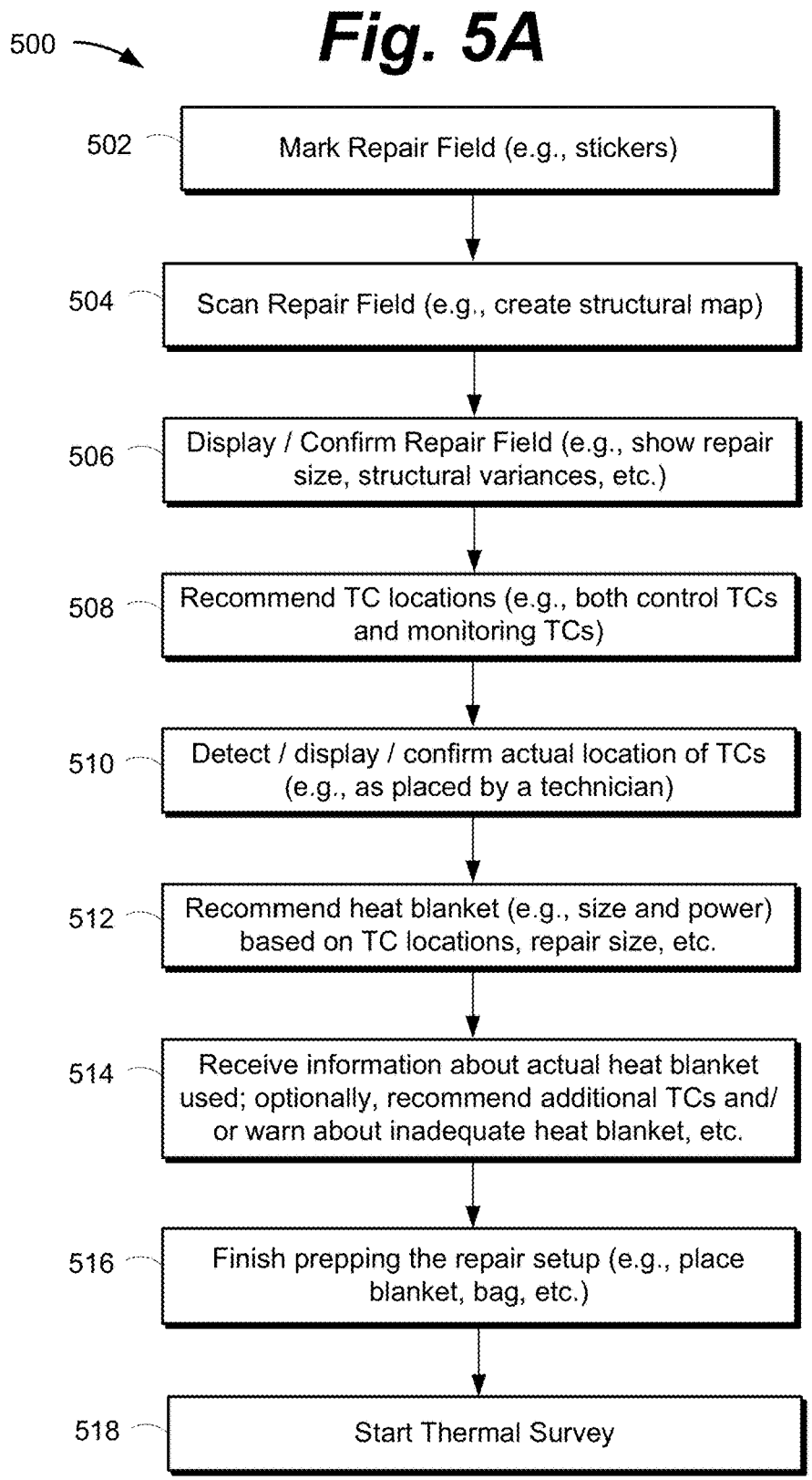

US 10,216,237 B2

SYSTEM AND METHOD FOR THERMAL MANAGEMENT GUIDANCE

FIELD

The present disclosure relates to hot bonder repairs of a structure, for example, a composite or metal structure, and more particularly to one or more systems, methods, routines and/or techniques for thermal management that may provide guidance related to a repair.

BACKGROUND

In the airplane industry, various parts of an aircraft (e.g., a wing, a fuselage, a fuselage section, an engine enclosure, etc.) may become damaged. When an aircraft component is damaged, a technician may repair the part. Some procedures for repairing an aircraft component include sanding down the damaged area, placing a patch over the damaged area and using a hot bonder and heat blanket to cure the patch to the aircraft component.

Further limitations and disadvantages of conventional and traditional approaches will become apparent to one of skill in the art, through comparison of such systems with some aspects of the present invention as set forth in the remainder of the present application and with reference to the drawings.

SUMMARY

The present disclosure describes one or more systems, methods, routines and/or techniques for thermal management. One or more systems, methods, routines and/or techniques may provide advice or guidance (e.g., to a repair technician) regarding how to perform a hot bond repair, for example, on an aircraft component that has been damaged. A thermal management advisor may provide advice or guidance regarding how to prepare a repair field prior to running a thermal survey. For example, the thermal management advisor may recommend a particular heat blanket, a configuration of the heat blanket, placement of various temperature sensors (e.g., TCs) and other preparation guidance. The thermal management advisor may provide advice or guidance regarding how to alter or manage the repair setup during a thermal survey. For example, thermal management advisor may recommend particular TCs or areas of the repair field that should be insulated. The thermal management advisor may save all repair setup configuration details in order to provide advice or guidance during the curing process. The thermal management advisor may provide advice or guidance regarding how to alter or manage the repair setup during the actual curing process.

One or more embodiments of the present disclosure describe a method for thermal management executed by a data processing system having at least one processor. The method may comprise receiving structural information about a structural composition of a repair field of a structure, where the repair field may include a repair area that includes an area that was damaged. The method may comprise generating a map of the repair field using the structural information, where the map may include a representation of the repair area. The method may comprise analyzing the structural information to determine suggested placements of temperature sensors near the repair area, where the temperature sensors may be used to control a hot bonder and associated heat blanket. In some embodiments, the structural information may be received from a scanner that is adapted to scan the repair field. In some embodiments, the scanner may be a geometry scanner. In some embodiments, the method may comprise displaying, on a screen of the data processing system, the suggested placements of the temperature sensors relative to the map of the repair field. In some embodiments, the method may comprise displaying, on the screen of the data processing system, the map of the repair field, including the representation of the repair area. In some embodiments, the map of the repair field may include information about the structural composition of a repair field, and in some embodiments, displaying the map of the repair field may include displaying structural information, variations in density, thickness or thermal mass of the repair field. In some embodiments, the method may comprise causing a projector that is coupled to the data processing system to project the suggested placements of the temperature sensors onto the repair field.

In some embodiments, the method may comprise receiving, from the scanner, temperature sensor placement information that indicates actual placements of the temperature sensors near the repair area. The scanner may be adapted to detect the actual placements of the temperature sensors near the repair area. In some embodiments, the method may comprise generating temperature sensor indicators, where each temperature sensor indicator may relate to a temperature sensor as detected by the scanner, and where each of the temperature sensor indicators may be associated with a location on the map of the repair field. In some embodiments, the method may comprise displaying, on the screen of the data processing system, the temperature sensor indicators relative to the map of the repair area. In some embodiments, the method may comprise receiving, as input from a user, a unique number for each temperature sensor indicator, wherein the unique numbers may coincide with numbers associated with the temperature sensors by a hot bonder. In some embodiments, the method may comprise analyzing the map of the repair area and the temperature sensor indicators to determine a repair size that encompasses all of the temperature sensors placed near the repair area. In some embodiments, the method may comprise determining an appropriate heat blanket size that covers the repair size. In some embodiments, the method may comprise displaying, on a screen of the data processing system, the appropriate heat blanket size. In some embodiments, the method may comprise analyzing the structural information to determine an appropriate heat blanket power supply that adapts a heat blanket to heat the repair field according to a desired heating profile. In some embodiments, the method may comprise displaying, on a screen of the data processing system, the appropriate heat blanket power supply. In some embodiments, the method may comprise receiving, as input from a user, heat blanket information that indicates a size and power of a heat blanket that will be used to perform a hot bonder repair. In some embodiments, the method may comprise analyzing the heat blanket information, the map of the repair area and the temperature sensor indicators to determine whether the heat blanket is acceptable. In some embodiments, the method may comprise displaying, on a screen of the data processing system, one or more warnings or suggestions regarding the heat blanket that will be used. In some embodiments, one of the warnings or suggestions regarding the heat blanket may include a suggestion that one or more additional temperature sensors be placed near the near the repair area.

One or more embodiments of the present disclosure describe a method for thermal management executed by a data processing system having at least one processor. The method may comprise generating a map of a repair field of a structure, wherein the repair field may include a repair area that includes an area that was damaged. The method may comprise receiving temperature readings from multiple temperature sensors that are placed near the repair area. The method may comprise analyzing the map of the repair area and the temperature readings to determine one or more insulation suggestions, wherein each insulation suggestion may include an indication of one or more of the temperature sensors or an insulation area in the repair field. In some embodiments, the method may comprise displaying, on a screen of the data processing system, the one or more insulation suggestions relative to the map of the repair area. In some embodiments, the method may comprise causing a projector that is coupled to the data processing system to project the one or more insulation suggestions onto the repair field. In some embodiments, one or more of the insulation suggestions may include adding one or more insulation pieces to cover the indicated one or more temperature sensors or the insulation area. In some embodiments, one or more of the insulation suggestions include removing one or more insulation pieces that are covering the indicated one or more temperature sensors or the insulation area.

In some embodiments, the method may comprise receiving, as input from a user, a confirmation that the one or more insulation suggestions were implemented by the user. In some embodiments, the method may comprise receiving, as input from a user, for one or more areas of the repair field, an indication of types of insulation placed and number of layers of insulation placed. In some embodiments, the method may comprise receiving updated temperature readings from multiple temperature sensors that are placed near the repair area. In some embodiments, the method may comprise analyzing the map of the repair area and the temperature readings to determine whether to provide additional insulation suggestions. In some embodiments, the method may comprise saving, as insulation configuration information, the indications of the types of insulation placed and the number of layers of insulation placed. In some embodiments, the method may comprise displaying, on a screen of the data processing system, before start of a hot bonder curing process, the insulation configuration information.

One or more embodiments of the present disclosure describe a repair management system. The system may comprise multiple temperature sensors that are adapted to be placed near a repair area, where the repair area may include an area of a structure that was damaged. The system may comprise a scanner that is adapted to scan a repair field of the structure, where the repair field may include the repair area and parts of structure surrounding and underlying the repair area. The scanner may output structural information about a structural composition of the repair field. The system may comprise a data processing system that is coupled to the temperature sensors and the scanner, where the data processing system may include a processor that executes computer code to receive the structural information from the scanner, generate a map of the repair area, and analyze the structural information to determine suggested placements of the temperature sensors near the repair area. In some embodiments, the processor executes computer code to display, on a screen of the data processing system, the suggested placements of the temperature sensors relative to the map of the repair area. In some embodiments, the scanner is a geometry scanner.

In some embodiments, the scanner is adapted to scan the repair field to detect actual placements of the temperature sensors near the repair area and output temperature sensor placement information. The processor may execute computer code to receive the temperature sensor placement information from the scanner. The processor may execute computer code to generate temperature sensor indicators where each temperature sensor indicator relates to a temperature sensor as detected by the scanner, and where each of the temperature indicators may be associated with a location on the map of the repair field. The processor may execute computer code to display, on the screen of the data processing system, the temperature sensor indicators relative to the map of the repair area.

One or more embodiments of the present disclosure describe a repair management system. The system may comprise multiple temperature sensors that are placed near a repair area, where the repair area may include an area of a structure that was damaged. The system may comprise a scanning system adapted to scan the repair area. The system may comprise a data processing system that is coupled to the temperature sensors and a scanner, where the data processing system includes a processor that may execute computer code to generate a map of the repair area based on information received from the scanning system. The processor may execute computer code to receive temperature readings from the multiple temperature sensors. The processor may execute computer code to analyze the map of the repair area and the temperature readings to determine one or more insulation suggestions, wherein each insulation suggestion may include an indication of one or more of the temperature sensors or an insulation area in a repair field that should be covered with insulation. In some embodiments, the processor may execute computer code to display, on a screen of the data processing system, the one or more insulation suggestions relative to the map of the repair area. In some embodiments, the scanner is a geometry scanner. In some embodiments, the scanning system includes a wand accessory that is adapted to detect when one of the temperature sensors is close to the wand, where the wand accessory may allow a user to enter, into the data processing system, a unique number for each of the temperature sensors.

These and other advantages, aspects and novel features of the present disclosure, as well as details of an illustrated embodiment thereof, will be more fully understood from the following description and drawings. It is to be understood that the foregoing general descriptions are exemplary and explanatory only and are not restrictive of the disclosure as claimed.

BRIEF DESCRIPTION OF THE DRAWINGS

Several features and advantages are described in the following disclosure, in which several embodiments are explained, using the following drawings as examples.

FIG. 2 depicts an illustration of a block diagram showing example components, connections, modules, interactions and the like of a repair setup, according to one or more embodiments of the present disclosure.

FIGS. 5A-5C depict flow diagrams that show example steps in one or more methods for thermal management, in accordance with one or more embodiments of the present disclosure.

DETAILED DESCRIPTION

Figure 1A:
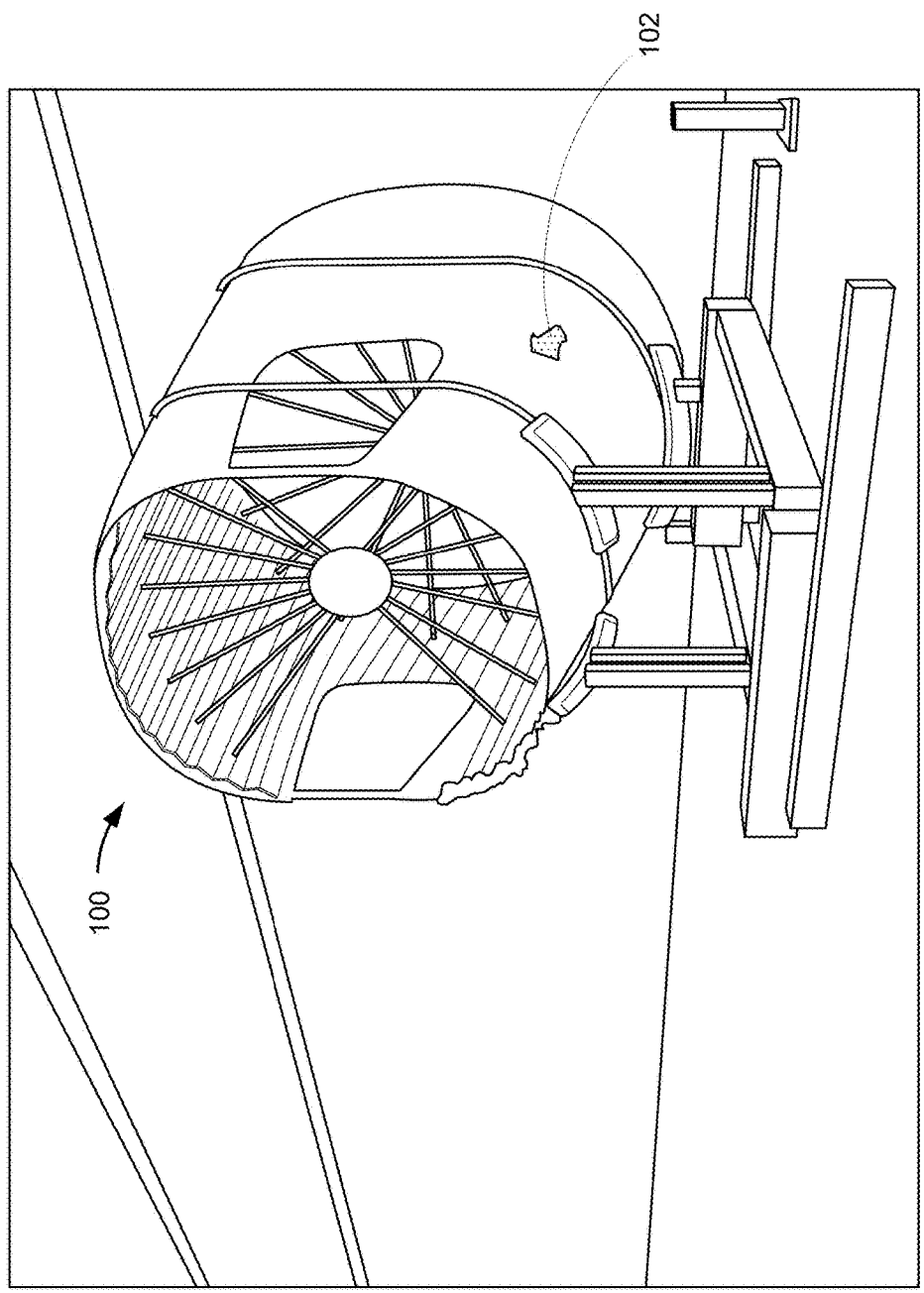
FIG. 1A depicts an illustration of an example aircraft component (e.g., a fuselage section).

In the airplane industry, various components of an aircraft (e.g., a wing, a fuselage, a fuselage section, an engine enclosure, etc.) may become damaged. Aircraft components may be made of a metal or composite material. When an aircraft component is damaged, a technician may repair the part, for example, by repairing the metal or composite damaged area. Various procedures for repairing an aircraft component include sanding down the damaged area, placing a patch (e.g., composite or metal patch) over the damaged area and using a hot bonder and heat blanket to cure the patch to the aircraft component. Various methods of repairing an aircraft component may use a complex setup and may make complex adjustments during the curing process. Therefore, various methods of repairing an aircraft component may use highly skilled technicians to perform the setup and the curing process. If the technician is not properly trained or experienced, the curing process may further damage the aircraft component. Experienced technicians (especially composite repair technicians) are rare, and the cost of training technicians to perform quality hot bond repairs may be high. For example, training may take many hours of classroom training and years of hands on experience. It may be expensive (e.g., travel costs, etc.) to consistently pull in the few experienced technicians to assist with repairs.

These complex repair procedures and the shortage of qualified repair technicians have led to various repair issues in the airplane industry. One example repair issue is high defect rates (e.g., inadequate repairs) for hot bond repairs. A defected repair may be redone, which may add significant cost to the overall repair process. A repair may defect because the technician caused the repair area and/or the surrounding structure to burn. Burning the repair area may lead to even higher repair costs to fix the burned areas. A repair may defect because the technician under-cured the patch. A repair may defect because the repair had to be aborted during the curing process because various temperature sensors (e.g., TCs) exceeded tolerable ranges. Examples of mismanagement by technicians that may lead to these repair defects include improper placement of temperature sensors (e.g., TCs), improper heat blanket sizing, improper bagging of the curing setup and improper insulating. Another example repair issue is delays on production/repair lines. Another example repair issue is slow set up times. Another example repair issue is quality assurance (QA) buyoff delays. For example, if a technician sets up the repair area improperly, it may take inspectors much longer to verify that the curing was done correctly.

The present disclosure describes one or more systems, methods, routines and/or techniques for thermal management. One or more systems, methods, routines and/or techniques may provide advice or guidance (e.g., to a repair technician) regarding how to perform a hot bond repair, for example, on an aircraft component that has been damaged. A thermal management advisor may provide advice or guidance regarding how to prepare a repair field prior to running a thermal survey. For example, the thermal management advisor may recommend a particular heat blanket, a configuration of the heat blanket, placement of various temperature sensors (e.g., TCs) and other preparation guidance. The thermal management advisor may provide advice or guidance regarding how to alter or manage the repair setup during a thermal survey. For example, the thermal management advisor may recommend particular TCs or areas of the repair field that should be insulated. The thermal management advisor may save all repair setup configuration details in order to provide advice or guidance during the curing process. The thermal management advisor may provide advice or guidance regarding how to alter or manage the repair setup during the actual curing process. The thermal management advisor may interface with or adapt to existing hot bond equipment.

The thermal management systems, methods and/or techniques described herein may lower the defect rate for hot bond repairs by removing or reducing uncertainty that a technician may have during set-up and execution of the repair. The thermal management systems, methods and/or techniques described herein may lead to fewer burned structures, more correctly cured repairs, fewer aborted cures and less out of tolerance temperature sensor rejections. The thermal management systems, methods and/or techniques described herein may lead to proper heat blanket sizing, correct insulating and heat sinking, intelligently placed temperature sensors. The thermal management systems, methods and/or techniques described herein may aid in creating a uniform repair process that may be used throughout various industries, such that technicians, whether highly experience or not, may consistently perform repairs. The thermal management systems, methods and/or techniques described herein may lead to reduced setup times for hot bond repairs, fewer production line delays and faster QA (quality assurance) buyoffs. The thermal management systems, methods and/or techniques described herein may reduce the cost of training inexperienced technicians for hot bond repairs, and may avoid or reduce pulling in a highly experienced technician to assist with the repair. The thermal management systems, methods and/or techniques described herein may reduce the cost of reworked repairs by ensuring that repairs are correct the first time.

It should be understood that, although various descriptions throughout this disclosure may explain the repair of airplane or aircraft components, the various embodiments of the present disclosure may apply to the repair of other parts, for example, any metal or composite parts. For example, the repair procedures explained herein could be used on automobile parts, ship parts, other vehicle parts, machinery parts, or any other part (e.g., metal or composite part) that may be damaged and/or ready for repair. Therefore, descriptions provided herein that use an aircraft component as example repair surface are not intended to limit the scope of the disclosure. Aircraft components may be made of a metal or composite material, and various descriptions provided herein may describe repair processes that may be performed on metal or composite parts. It should be understood, however, that the various embodiments of the present disclosure may apply to parts made of various other materials, for example, plastics, synthetic materials and the like.

In order to describe the various embodiments of the present disclosure, it may be beneficial to describe various steps in an example repair process. As explained above, in the airplane industry, various parts of an aircraft (e.g., a wing, a fuselage, a fuselage section, an engine enclosure, etc.) may become damaged. FIG. 1A shows an illustration of an example aircraft component 100 (e.g., a fuselage section). Aircraft component 100 may be made of metal or composite material. Aircraft component 100 may include a defect 102, for example, because the aircraft component 100 was damaged. For example, aircraft component 100 may have been scratched, punctured, sliced or damaged in various other ways.

Figure 1B:
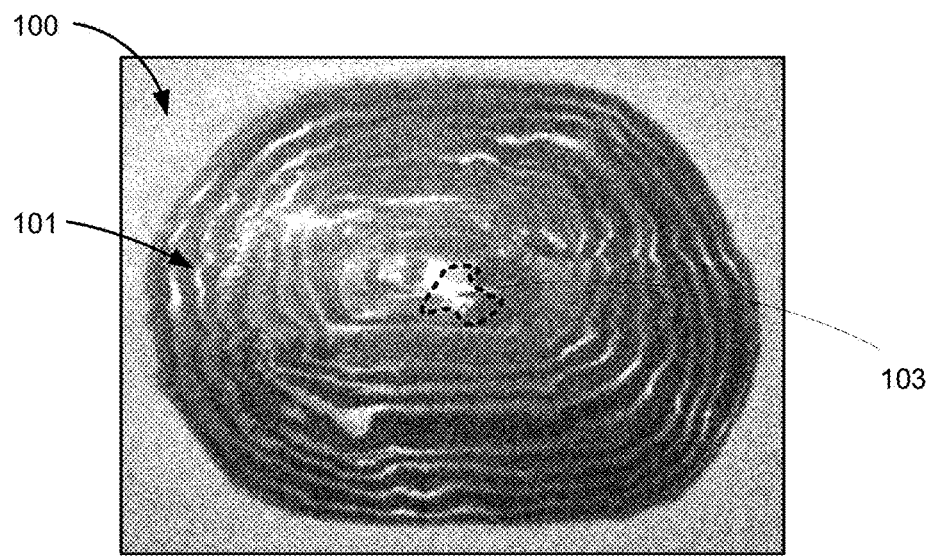
FIG. 1B depicts a close-up illustration of example aircraft component (e.g., a fuselage section) with a sanded area.

In order to prepare the damaged area for repair, the damaged area may be sanded down, tapered or scarfed. FIG. 1B shows a close-up illustration of an example aircraft component 100 (e.g., a fuselage section) with a sanded area 101. A sanded area may also be referred to as a sanded area, a taper sanded area or a scarfed area. The sanded area 101 may encompass the defect (location of defect shown by number 103), with a significant margin around the defect. The sanding process may remove any damaged pieces of the aircraft component 100 that are sticking out. The sanding process may remove layers of the aircraft component (e.g., layers of metal or composite) surrounding the defect, for example, to expose and remove the entire damaged area, including the defect. In this respect, after sanding is done, the defect may have been removed and may not be visible. The sanding process may even the surface of the aircraft component around the defect area to prepare the surface for bonding.

Figure 1C:
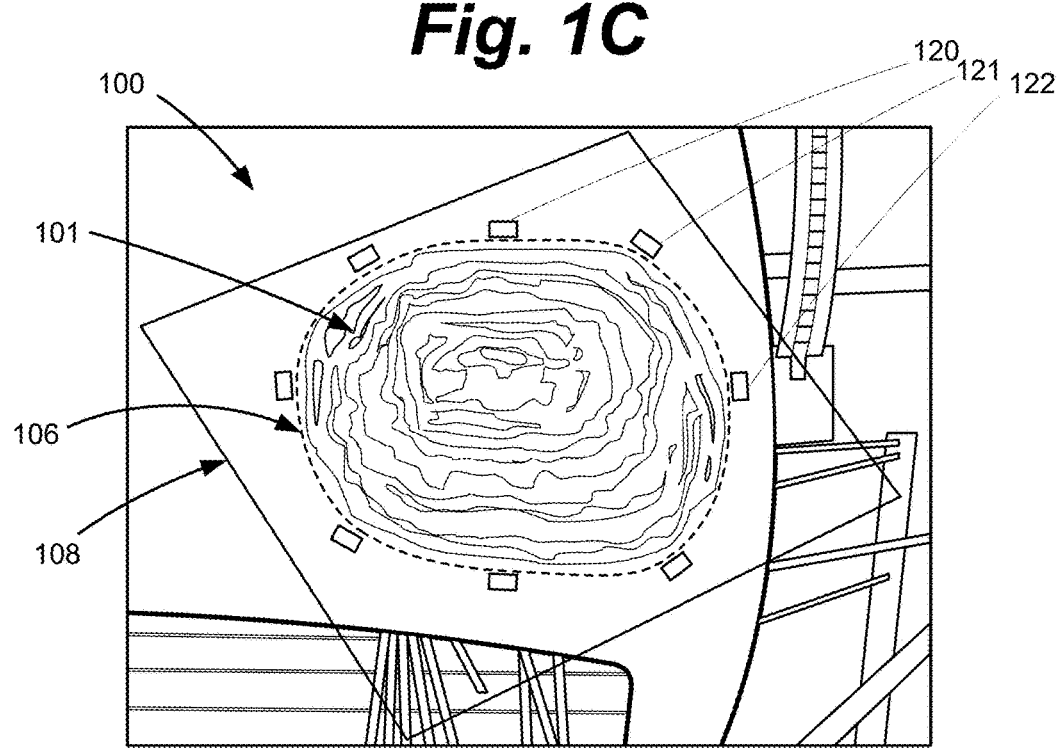
FIG. 1C depicts a close-up illustration of example aircraft component (e.g., a fuselage section) with a sanded area.

A repair patch may be prepared to be used in the repair. The repair patch may be made out of the same material as the aircraft component (e.g., metal or composite material). In some situations, the repair patch may be made of a different material than the aircraft component (e.g., a composite patch on a metal fuselage section). FIG. 1C shows a close-up illustration of an example aircraft component 100 (e.g., a fuselage section) with sanded area 101. The repair patch may be cut to approximately the same size as the sanded area 101. FIG. 1C shows an example patch size (shown generally by number 106) relative to the sanded area 101. The patch may be positioned or laid over the sanded area 101. FIG. 1C shows an example of the patch location and orientation (shown generally by number 106) relative to the sanded area 101. An adhesive may be used to hold the patch in place.

Figure 1D:
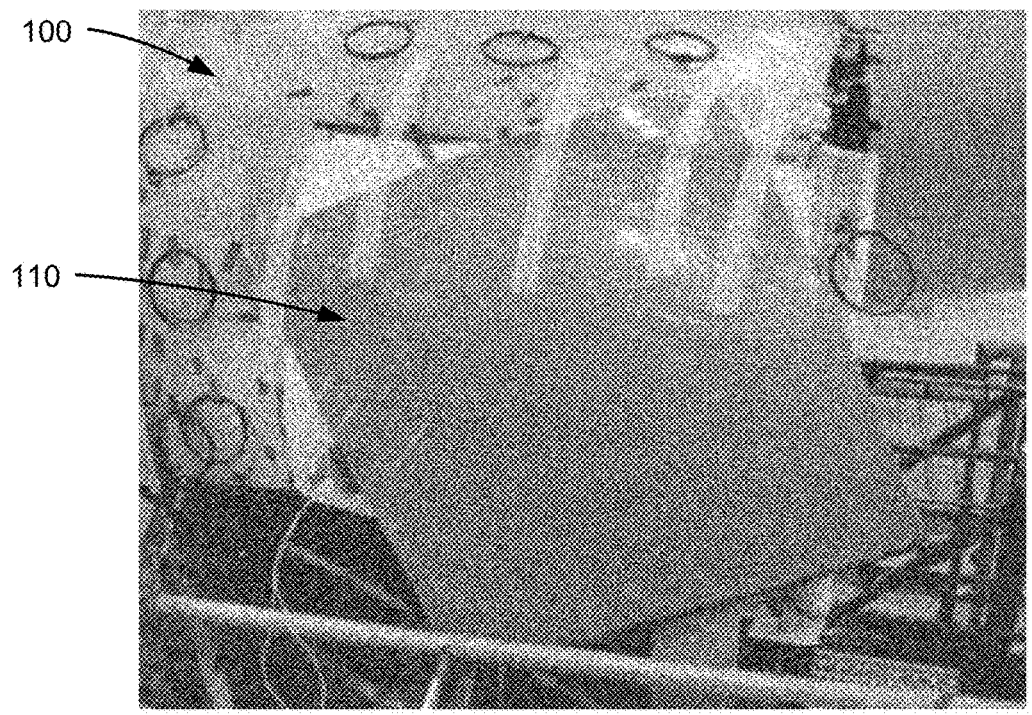
FIG. 1D depicts a close-up illustration of example aircraft component (e.g., a fuselage section) with a heat pad secured in place.

A heat blanket may be placed over the repair area, including over the sanded area 101 and the patch (e.g., placed as shown by number 106). Heat blankets of various sizes may be used. A technician may select a heat blanket that is appropriately sized to perform a cure on the particular repair area. The heat blanket may be oriented appropriately relative to the repair area, for example, oriented as shown by number 108 in FIG. 1C. The heat blanket may completely cover the repair area (including the sanded area and the patch), for example, with a minimum margin around the repair area. If a heat blanket or patch extends over the edge of an aircraft component (e.g., a fuselage section), the edge may be handled by the technician in a variety of ways, for example, by constructing an extension of the aircraft component. The heat blanket may be secured in place, for example, by tape or other adhesive. FIG. 1D shows a close-up illustration of example aircraft component 100 (e.g., a fuselage section) with a heat pad 110 secured in place over the repair area and patch. A vacuum bag may be placed over the entire repair (e.g., over the heat blanket 110, the patch and the repair area). The vacuum bag may be placed over the entire repair, including the heat blanket 110. The edges of the vacuum bag may be sealed, for example, sealed to the aircraft component with an adhesive. Air may be evacuated from the vacuum bag causing the vacuum bag to clamp down tightly over the entire repair. Once the air is evacuated, the vacuum bag may apply pressure to the heat blanket 110, which may ensure that the heat blanket maintains even contact with the repair area and the surrounding structure.

Figure 1E:
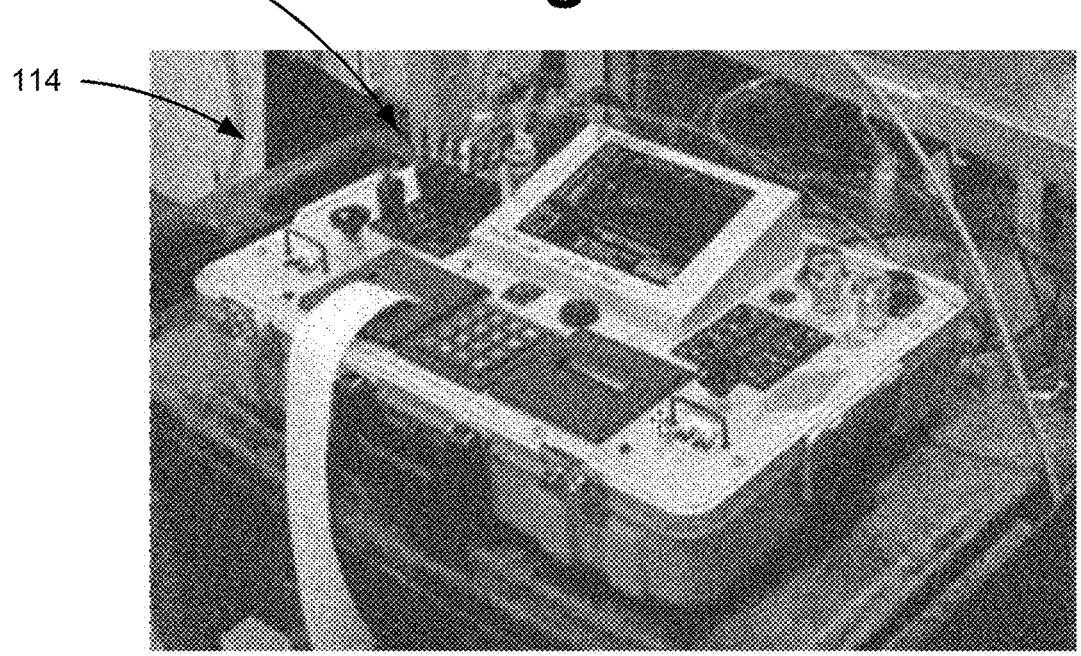
FIG. 1E depicts an illustration of an example hot bonder.

The heat blanket 110 may include heating elements that heat up to apply heat to the repair patch and the repair area in general. This heat causes the repair patch to cure to the sanded surface and any surrounding structure that the patch covers. The heat blanket 110 may be connected to a hot bonder. FIG. 1E shows an illustration of an example hot bonder 114. The term hot bonder may refer to a system (e.g., including a computer, I/O ports, a display, various user input features, etc.) that connects to a heat blanket and nearby temperature sensors (e.g., TCs), to read information from the TCs (e.g., current temperatures) and send power (e.g., electrical current) to the heat blanket to cause the heat blanket to heat up. The term thermal couple (TC) may refer generally to a sensor that produces a voltage where the voltage depends on the temperature at the point or "tip" of the sensor. Multiple TCs may be used to monitor the temperature of various points in area. Various descriptions herein may refer to TCs as one example of a temperature sensor that produces a voltage; however, it should be understood that the various embodiments of the present disclosure may utilize other types of temperature sensors. Therefore, use of the term TC in various descriptions herein is not meant to limit the disclosure, and other temperature sensors may be used in alternate embodiments.

As can be seen in FIG. 1E, hot bonder 114 may include various ports 116 that may accept wires that are connected to temperature sensors (e.g., TCs). For example, each port (shown generally at number 116) may accept a wire that connects to one particular temperature sensor (e.g., TC). Placement of temperature sensors and/or TCs (e.g., under the heat blanket) is described in detail herein. One example of TC placement can be seen in FIG. 1C, where TCs (e.g., TCs 120, 121, 122) are placed around or near the perimeter of the repair area (e.g., the sanded area 101). Each of the TCs shown in FIG. 1C may include a wire that runs from the particular TC to a port on the hot bonder. The TCs shown in FIG. 1C may be control TCs and may be distinguishable from monitoring TCs, which will be described more below. Control TCs may communicate temperature information to the hot bonder, for example, such that the hot bonder may alter the power output to the heat blanket during a curing process. Referring again to FIG. 1E, the hot bonder 114 may receive information (e.g., from control TCs) about current temperatures around the heat blanket. Hot bonder 114 may include a control/power port (not shown) that may accept a cord (e.g., a power cord), where the other end of the cord may connect directly to the heat blanket. The hot bonder 114 may send power (e.g., electrical current) down the cord to the heat blanket to cause the heating elements in the heat blanket to heat up or cool down. In some examples, hot bonder 114 may communicate different power levels to the heat blanket based on information the hot bonder 114 receives from various temperature sensors or TCs (e.g., at ports 116).

In some situations, a thermal survey may be performed before the final cure is performed. The term thermal survey may refer generally to a test run (e.g., test heating/curing) of the repair setup. The thermal survey may include heating up the heat blanket to a certain temperature and monitoring various temperature sensors (e.g., TCs). The thermal survey may aid in determining whether the current repair setup will lead to an acceptable final curing process. For example, a thermal survey may aid in determining whether the entire patch and/or repair area will heat appropriately, in other words, whether an appropriate or desired heating profile will be achieved. For some particular heating profiles, various structural areas (e.g. areas of the aircraft component) of the repair area may heat to a temperature level that is appropriate for the structural area. For example, areas where the structure is thicker (e.g., a thicker wall of an aircraft component) may ideally be adjusted to be hotter and areas where the structure is thinner may ideally be adjusted to be cooler. In some situations patch thickness may vary, which may be compensated for in the heating profile.

Figure 1F:
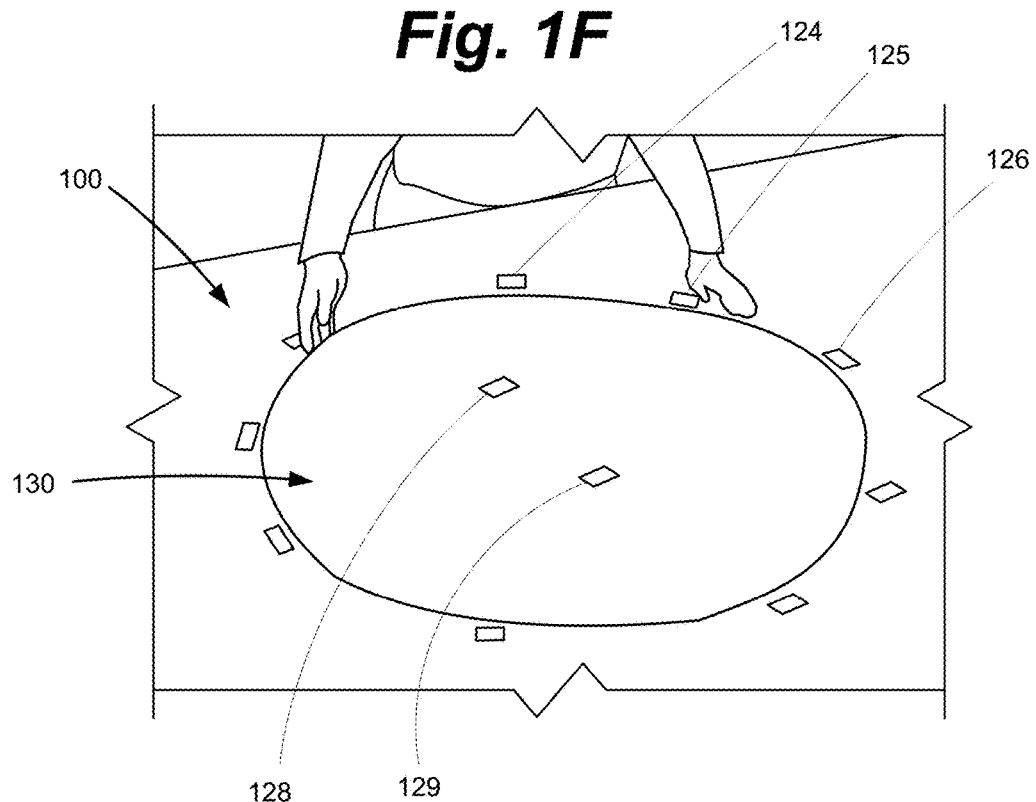
FIG. 1F depicts an illustration of an example test patch that may have been applied to a repair area of an aircraft component.

A test patch (or "surrogate patch") may be prepared to perform the thermal survey. The test patch may be similar to the repair patch that will be used. The test patch may be used to test the heating profile of the current repair setup. The test patch may be cut and applied to the repair area (e.g., the sanded area) in a similar manner to that explained above. FIG. 1F shows an illustration of an example test patch 130. In FIG. 1F, test patch may have been applied to the repair area (e.g., sanded area 101) of an aircraft component 100 after being cut to the approximate size of the repair area. A number of control TCs (e.g., TCs 124, 125, 126) may be placed around or near the perimeter of the repair area and/or the test patch 130. In some examples, the control TC locations that are used for the thermal survey will be the same control TC locations that are used to control the final cure. A number of monitoring TCs (e.g., TCs. 128, 129) may be placed around the thermal survey setup. As is shown in FIG. 1F, monitoring TCs (e.g., TCs. 128, 129) may be placed on top of the test patch 130. In some examples, monitoring TCs may be placed under the test patch 130. In some examples, monitoring TCs may be embedded within the test patch 130. Monitoring TCs may provide temperature feedback and information during a thermal survey, such that it may be confirmed that the heating profile appears to be acceptable across the whole repair area. Control TCs may be used as well during the thermal survey to receive temperature feedback and information, but control TCs may remain for the final curing process.

The thermal survey may be completed by performing a test heating. The heat blanket may be placed over the repair area, test patch and TCs. The heat blanket may be heated up to a particular temperature (e.g., 350 degrees for some composite materials). For example, the heat blanket may be heated up to the same temperature it will be at for the final cure. If temperature information from the TCs during the thermal survey appears to show an appropriate heating profile, the same or a similar repair setup may be used for the final curing process. If areas of the heating profile appear to be outside of acceptable temperature ranges, a technician may make adjustments to the repair/heating setup/configuration, with the goal of ensure that all TCs are within acceptable temperature ranges during the thermal survey. Once adjustments are made, the thermal survey may be performed again (or continued), e.g., the heat blanket temperature may be ramped up again (or maintained), and temperature readings from the TCs may be analyzed again.

Figure 1G:
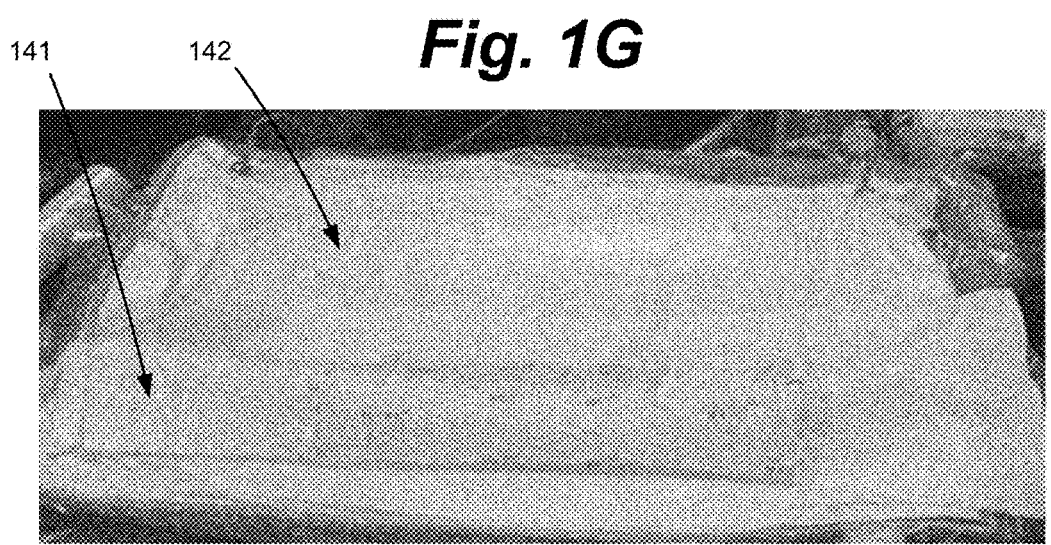
FIG. 1G depicts an illustration of example insulation (e.g., insulation pieces) that may have been applied to a repair setup.

One example of an adjustment that may be made by a technician if various TCs appear to be outside of acceptable temperature ranges may be to insulate areas near one or more TC, for example, near TCs that are running cold. TCs that are running cold may indicate a cold region in the heating profile. FIG. 1G shows an illustration of example insulation (e.g., insulation pieces 141, 142). Insulation pieces may be shaped (e.g., cut) into various configurations, for example, rectangle insulation pieces, oval insulation pieces, pie shaped insulation pieces, irregularly-shaped insulation pieces or any other shape or configuration. Various types and/or layers of insulation may be stacked on top of one another; however, in some example heating situations, there may be a maximum amount of acceptable insulation that can be used. Other examples of an adjustment that may be made by a technician if various TCs appear to be outside of acceptable temperature ranges may be to reposition the heat blanket, or reposition one or more TCs or test to see whether all the TCs appear to be functional.

As another example of a preparation step that may have to be completed before the final cure is performed, a repair area drying may be performed. With various cured composites (e.g., the underlying structure of the repair area), the cured composite material may absorb moisture from the surrounding environment over time. It may be necessary to dry the composite structure to allow for a good bond with the repair patch during the final curing process. In order to dry the composite structure, a repair area drying (e.g., a "dry cycle moisture removal") may be performed before the final curing process is performed. The repair area drying may be performed by heating the repair area up to a certain temperature for a period of time. In some situations, the repair area drying may be performed at the same time that the thermal survey is being performed. This dual preparation process may work, for example, because the drying process and the thermal survey may each run at the same or similar temperatures. In this respect, as the thermal survey is being performed to determine whether the heating profiled appears acceptable, the repair area may be drying concurrently.

Once the preparation steps have been completed, the final cure may be performed. The test patch may be replaced with a repair patch. The monitoring and/or control TCs may be removed. Control TCs may be placed to control the cure, and the control TC positions that were used for the thermal survey may be replicated to ensure the cure temperatures mimic those of the thermal survey. Alternatively, the same control TCs that were used for the thermal survey may be left in place (e.g., not removed), and used for the final cure. The heat blanket may be placed over the repair setup using a similar configuration as with the thermal survey. The hot bonder may then cause the heat blanket to heat up, e.g., by tuning the heating controls to the heat blanket based on information from control TCs. The heat blanket may cause the patch to bond to the repair area (e.g., the sanded area). Once the patch is bonded to the repair area, final sanding, buffing or the like may be performed to make the cured/repaired surface look presentable.

Various repair processes may rely heavily on the intuition, skill and experience of a well-trained technician. Various repair procedures are complex and may include the placement of various pieces and may include various alterations during the thermal survey and/or the repair process. As one example, various repair processes may use an experienced technician to manually read temperature values and other values during a thermal survey, and to make appropriate changes (e.g., to TC placement, blanket placement, insulation placement, etc.) based on the thermal survey information. The present disclosure describes one or more systems, methods, routines and/or techniques that may provide advice or guidance (e.g., to a repair technician) regarding how to perform a hot bond repair.

FIG. 2 depicts an illustration of a block diagram showing example components, connections, modules, interactions and the like of a repair setup 200, according to one or more embodiments of the present disclosure. Repair setup 200 may include a hot bonder 210 that may be in communication with a heat blanket 212. Heat blanket 212 may cover a repair area 214, for example, during thermal surveys and/or a final cure. Heat blanket 212 may include heating elements that heat up, for example, in response to power changes received from hot bonder 210. Heat blanket 212 may include control circuitry. Heat blanket control circuitry may facilitate heating of the heat blanket in response to power changes (e.g., electrical current) sent from the hot bonder 210. Heat blanket 212 may have multiple heating modes, and depending on the heating mode, the heat blanket 212 may respond differently to power changes sent from the hot bonder 210.

Repair area 214 may represent an area that surrounds a defect area. As explained above, the defect may no longer appear if the sanding process removed enough layers of the composite structure. The repair area 214 may be part of an aircraft component or structure. Repair area 214 may be sanded down similar to the sanded area 101 of FIG. 1B. The aircraft component or structure may be made of metal or composite, or other type of material. At various stages of a repair process (or preparation process or thermal survey) TCs (thermal couples) or other temperature sensors may be placed on or near the repair area 214. TCs may be connected (e.g., with one wire per TC) to the hot bonder 210 (e.g., with one hot bonder port per TC wire).

Repair setup 200 may include a thermal management system 201. Thermal management system 201 may include a computer 202, a scanning system 204 (including various scanning accessories 206), a junction box 216 and a projector 208. TCs may be connected to hot bonder 210 through junction box 216. Junction box 216 may pass signals and/or information from the TCs through to the hot bonder 210 and may also pass the same or similar signals related to the TCs to a computer, for example, computer 202. Thermal management system 201 (e.g., computer 202) may be in communicate with the hot bonder 210, for example, such that thermal management system 201 may receive information/data from hot bonder 210 or send information/data too hot bonder 210

Computer 202 may be any type of data processing system that includes at least one processor and at least one memory unit and is capable of executing code to perform various operations, routines and the like. Computer 202 may be a laptop computer, desktop computer, a tablet, smartphone, mobile device or any other type of computer or data processing system. Computer 202 may include a thermal management advisor 220, as explained more below. Computer 202 may include a junction box interface 222 that may facilitate communication between the thermal management advisor 220 and junction box 216. In this respect, thermal management advisor 220 may be adapted to receive temperature signals from (and optionally, transmit electrical current to) various TCs that may be placed near repair area 214. Computer 202 may include a scanning system interface 224 that may facilitate communication between the thermal management advisor 220 and scanning system 204. In this respect, thermal management advisor 220 may be adapted to receive information from the scanning system 204, for example, from the various scanning accessories 206 that are part of or connected to the scanning system 204.

Computer 202 may include a display 226. Thermal management advisor 220 may communicate with display 226 to cause various images, text, graphics and the like to appear on display 226. Display 226 may be an integrated screen or display, for example, a display or screen of a laptop computer, tablet computer, smartphone or the like. In some embodiments, display 226 may be external to computer 202, and computer 202 may be in communication with display 226 via one or more cords. Computer 202 may be in communication with a projector 208, for example, via a communication port such as a USB port, HDMI port, DVI port or VGA port. Projector 208 may shine light and project images, text, graphics and the like in the general direction of the repair area 214. In this respect, a technician may see information related to a repair (e.g., suggestions, guidance, etc.) illuminated directly on the repair area.

Figure 3A:
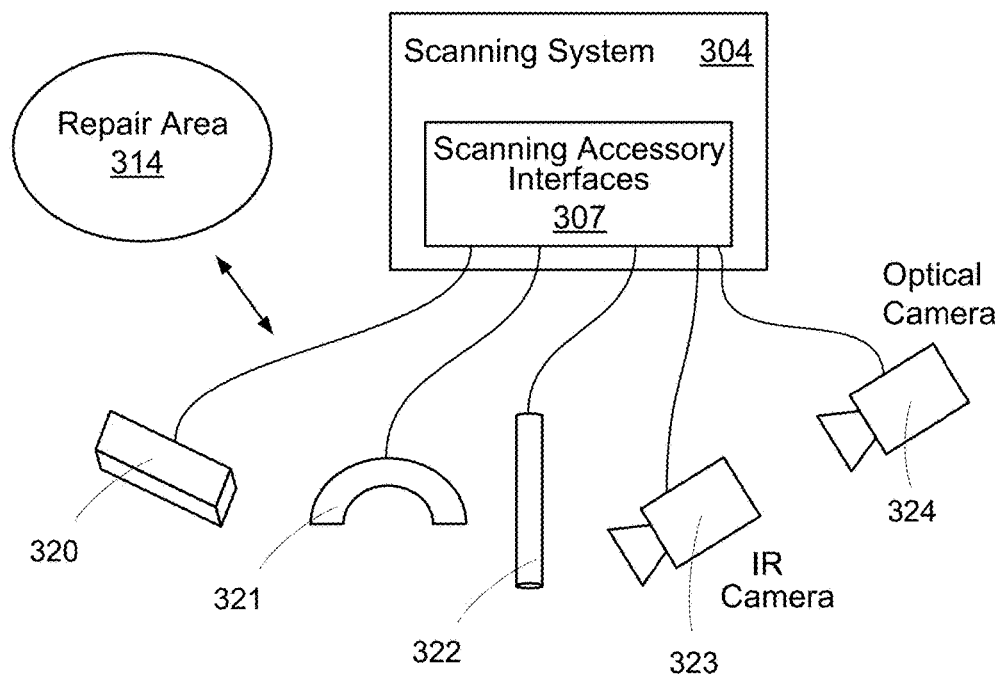
FIG. 3A depicts an illustration of an example scanning system, according to one or more embodiments of the present disclosure.

Scanning system 204 may include (or be in communication with) various scanning accessories 206. One or more of the scanning accessories 206 may be adapted to scan the repair area 214, including the surrounding structure (e.g., structure of an aircraft component). In some embodiments of the present disclosure, scanning accessories 206 may be connected directly to computer 202, in which case, the scanning system 204 may simply be comprised of the accessories. In other embodiments, scanning accessories may be connected to a hub, component, system or the like that may facilitate communication between accessories 206 and computer 202. FIG. 3A shows an illustration of an example expanded scanning system 304, where scanning system 304 may be similar to scanning system 204 of FIG.

2, for example. Scanning system 304 may include or be connected to various accessories, for example, accessories 320, 321, 322, 323, 324. Accessories may be connected to the scanning system 304 (e.g., a hub, component, system or the like) via one or more scanning accessory interfaces 307. Accessories (e.g., accessories 320, 321, 322, 323, 324) may scan a repair area 314 (e.g., similar to repair area 214 of FIG. 2) and the surrounding structure (e.g., structure of an aircraft component). Accessories may have various shapes and sizes, for example, to scan a variety of surfaces or structure contours. For example, one accessory (e.g., accessory 320) may include a substantially flat scanning surface, adapting the accessory to scan substantially flat surfaces or structure contours. As another example, one accessory (e.g., accessory 321) may include a curved scanning surface, adapting the accessory to scan curved surfaces or structure contours.

As another example, one accessory (e.g., accessory 322) may resemble a stick, wand, pole or the like, adapting the accessory to identify specific points near the repair area 314. For example, wand 322 may be capable of detecting TCs near repair area 314 if the tip of wand 322 is near a particular TC. A tip or point of the wand may be moved near an item to determine whether the item is a TC or whether a TC is close to the tip. Various types of wands may be included in a scanning system and a technician may use various types of wands to detect TCs. Wands may be designed in various ways (e.g., employing various technologies) to detect the presences and/or location of a TC. As one example, a wand (e.g., an Eddy Current wand) may sense the presence of metallic material (e.g., a TC sensor and/or wire). This type of wand may sense metal/TC material on the front side of the structure (e.g., an aircraft component) or on the backside of the structure. An Eddy Current wand may use electromagnetic induction to detect irregularities (e.g., TCs) in or near conductive materials. As another example, a wand (e.g., a temperature inducing wand) may include a heated or cooled tip that can slightly alter the surface temperature of another object. In this respect, a temperature inducing wand may be touched or applied to a TC (or near a TC), and the TC temperature sensor may sense the change in temperature induced by the wand. The thermal management advisor 220 and/or computer 202 may then detect the change in temperature of the particular TC, for example, via a junction box connection to the TCs. As another example, a wand (e.g., a frequency receiver wand) may be adapted to detect certain radio frequencies emitted from an object, such as a TC. In order to cause a TC to emit a frequency (e.g., a radio signal), the thermal management advisor 220 and/or computer 202 may send a signal to a TC, for example, by sending a signal to the junction box, which in turn is sent to the TC. A TC may emit a radio signal when it receives a current/signal, and then a frequency receiver wand may detect the radio signal emitted from the TC.

As another example of an accessory that may be used to detect TCs, an accessory (e.g., accessory 323) may be an IR camera that is adapted to detect various items near the repair area 314. For example, an IR camera may be capable of detecting TCs near repair area 314 if the TCs are emitting heat. In order to cause a TC to emit heat, the thermal management advisor 220 and/or computer 202 may send a signal (e.g., current) to a TC, for example, by sending a signal to the junction box, which in turn is sent to the TC. A TC may emit heat when it receives current pushed to it. In this respect, a heated TC may be sensed by an IR camera, and the IR camera may communicate with the thermal management advisor 220 and/or computer 202 to indicate which TC heated up. This type of TC identification may be useful, especially for large hot bond repairs, which may include more than one hundred TCs. With this many TCs placed around a repair area, it may be easy to lose traceability of one or more TCs, which may lead to improper heating. The computer 202 and/or thermal management advisor 220 (in communication with the various TCs) and an IR camera may be used to solve this issue. For example, the thermal management advisor 220 and/or computer 202 may cause the TC that it knows to be TC #1 to heat up, but the thermal management advisor 220 may not know the location of TC #1. When TC #1 heats up, the IR camera may detect the TC location and may communicate this information to the thermal management advisor 220 and/or computer 202. The rest of the TCs may then be sequentially detected, for example, without any human interaction. In some embodiments, another example accessory that may be connected to scanning system 304 is an optical camera 324. Optical camera 324 may provide visual information, for example, which may be used to locate TCs, detect information about the repair area, and the like.

Figure 3B:
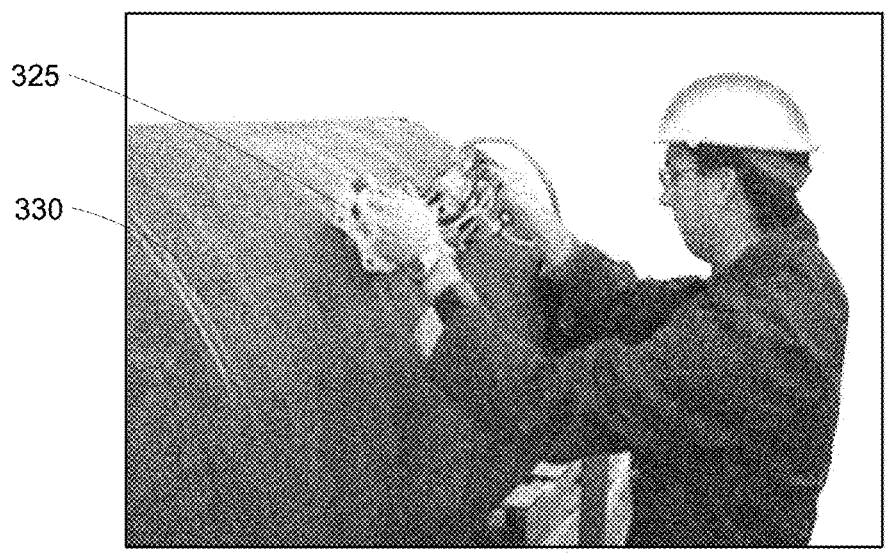
FIG. 3B depicts an illustration of an example geometry scanner, according to one or more embodiments of the present disclosure.

Various accessories (e.g., accessories 320, 321) may be adapted to determine various attributes of the surrounding/underlying structure (e.g., an aircraft component) of repair area 314. For example, these accessories may detect changes in density, thickness, thermal mass and ply drops, as well as other irregularities or changes in the composition of the surrounding/underlying structure. These types of accessories may be generally referred to as geometry scanners. FIG. 3B shows an illustration of one type of a geometry scanner 325 (e.g., a UT scanner or a continuous capture linear array (CCLA) scanner). In general, a geometry scanner (e.g., a CCLA scanner) may be a type of NDI (non-destructive inspection) scanner that rolls (or otherwise moves) across an area (e.g., aircraft component 330) to scan the area. Based on the scan, a geometry scanner may create a structural map, for example, that shows various changes in density, thickness, thermal mass and the like. The structural map may be a 2D map. In various embodiments, other types of geometry scanners or other scanners may be used. For example, a flash thermography scanner may be used, a scanner which may detect thickness variations in a structure. A flash thermography scanner may be a type of NDI (non-destructive inspection) scanner that may map thermal patterns (or "thermograms") on the surface of objects or structures, for example, through the use of some kind of infrared detector.

Figure 3C:
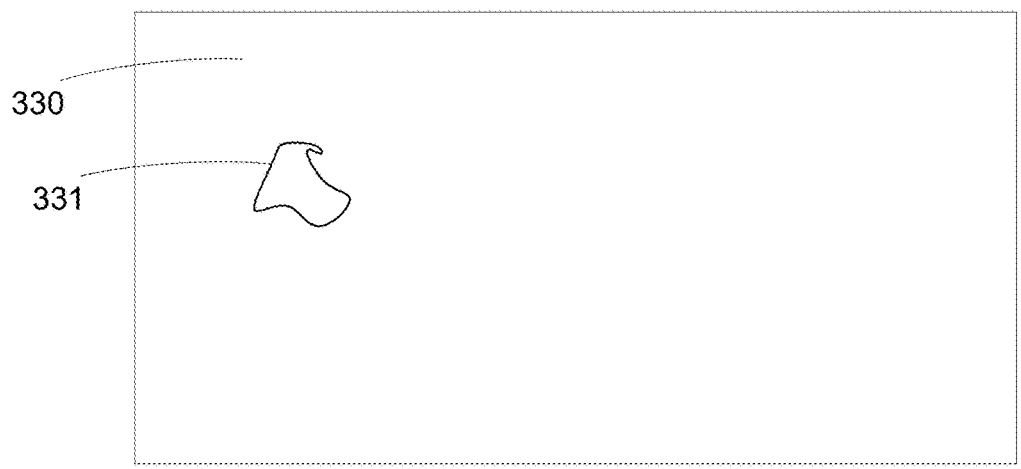
FIG. 3C depicts an illustration of a structural surface and a defect area, according to one or more embodiments of the present disclosure.
Figure 3D:
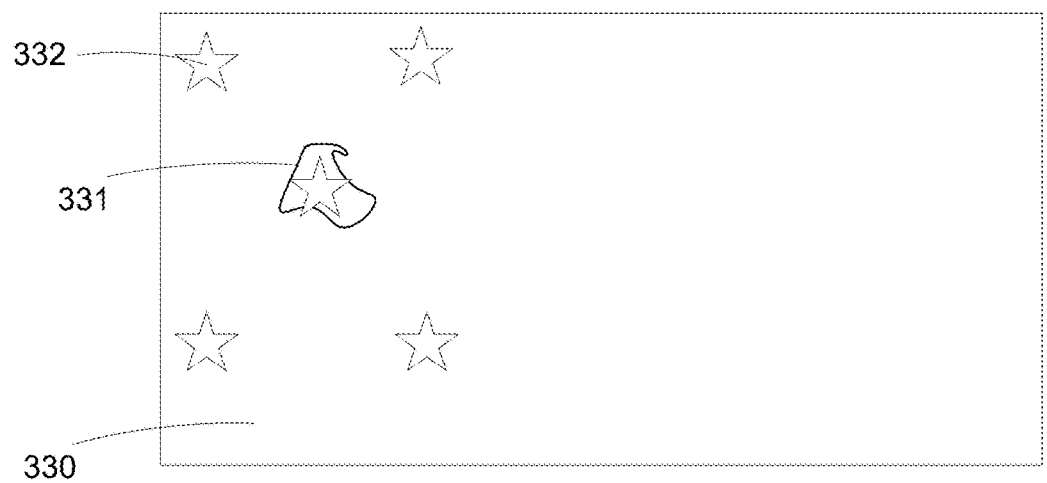
FIG. 3D depicts an illustration of a structural surface, a defect area and multiple stickers or fiducial markers, according to one or more embodiments of the present disclosure.

A geometry scanner may be capable of detecting (and including in the structural map) various markers or items in the field of view of the scanner. For example, a geometry scanner may detect TCs that have been placed in the scanning field of the scanner. As another example, a geometry scanner may detect stickers (e.g., sticker 332) or fiducial markers in the scanning field of the scanner. FIGS. 3C and 3D show examples of how and/or why stickers (e.g., sticker 332) may be used when scanning a structural surface (e.g., aircraft component 330). Defect area 331 in FIG. 3C may indicate where a defect exists or existed (e.g., before it was sanded away). As shown in FIG. 3D, stickers (e.g., sticker 332) may be placed on the structural surface 330 to indicate the general field of the repair. These stickers (e.g. sticker 332) may aid a geometry scanner in keeping track of the repair field, for example, if multiple passes of the scanner are used in order to scan the entire repair field. As one example, a geometry scanner may take a first pass over the repair field of FIG. 3D. The first pass may only capture part of the repair field, for example, the left half. The geometry scanner may take a second pass to capture the remainder of the repair field, for example, the right half. The geometry scanner may then create a single structural map by stitching together structural maps from the individual scans, using the stickers as a placement and orientation guide. In some situations, a geometry scanner may have to take more than two passes over a repair field. The same stitching concept (using stickers as markers) may be applied to stitch together more than two structural maps. In some embodiments, the various partial structural maps may be stitched together by a computer program external to the geometry scanner, for example, a routine in the scanning system (e.g., scanning system 204) or in the computer that runs the thermal management advisor (e.g., computer 202).

Figure 4:
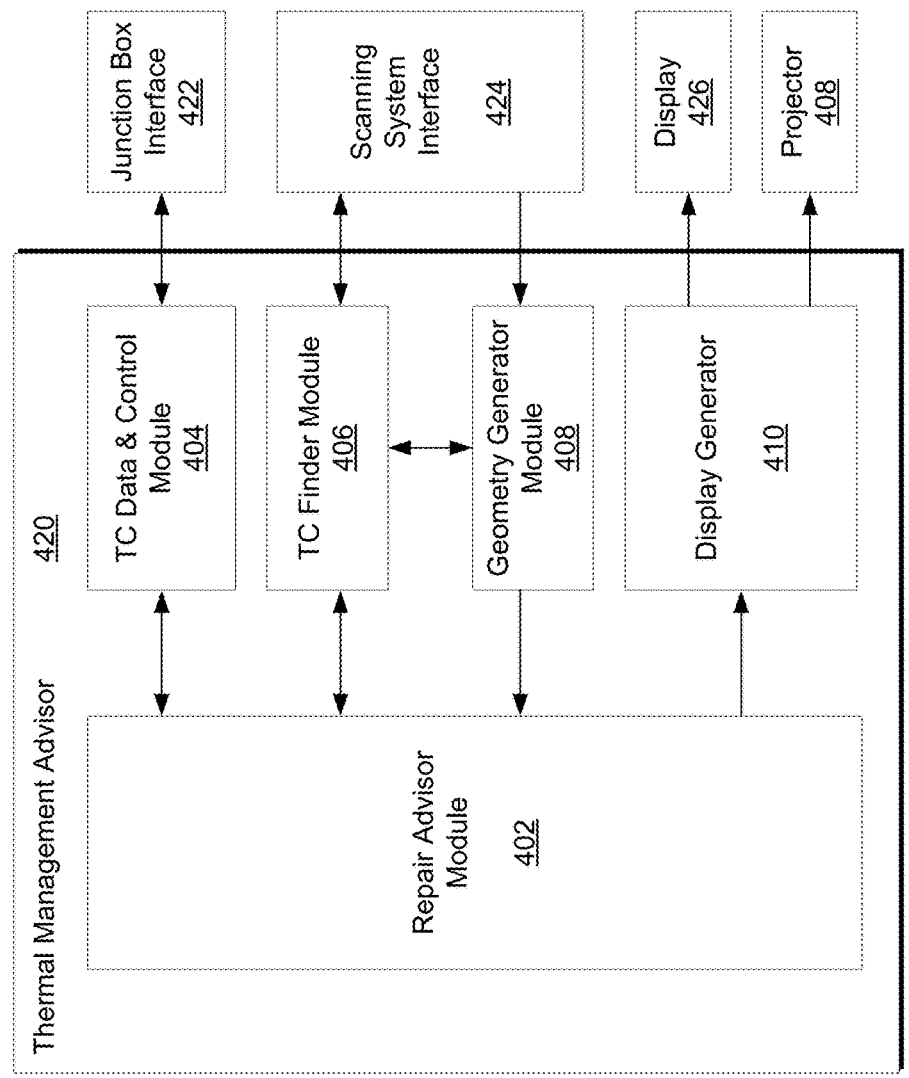
FIG. 4 depicts an illustration of a block diagram showing example components, routines, interactions and the like of a thermal management advisor, according to one or more embodiments of the present disclosure.

FIG. 4 depicts an illustration of a block diagram showing example components, routines, interactions and the like of a thermal management advisor 420, according to one or more embodiments of the present disclosure. Thermal management advisor 420 may be similar to the thermal management advisor 220 of FIG. 2, for example. Thermal management advisor 420 may communicate with junction box interface 422, which may in turn communicate with a junction box to receive data from (and optionally, send electrical current to) various TCs. Junction box interface 422 may be similar to junction box interface 222 of FIG. 2, for example. Thermal management advisor 420 may communicate with scanning system interface 424, which may in turn communicate with a scanning system to receive data from various scanning accessories. Scanning system interface 424 may be similar to scanning system interface 224 of FIG. 2, for example. Thermal management advisor 420 may communicate with a display 426 and/or a projector 408, for example, to display images, text, graphics and the like to a technician. Display 426 and projector 408 may be similar to display 226 and projector 208 of FIG. 2, for example.

Thermal management advisor 420 may include various routines, modules, methods, procedures, pieces of code, software or the like. Thermal management advisor 420 may include a TC data & control module 404. TC data & control module 404 may communicate with junction box interface 422, which may in turn communicate with a junction box to receive data (e.g., temperature information) from (and optionally, send data to) various TCs. TC data & control module 404 may communicate with repair advisor module 402 to send and/or receive information related to TC data (e.g., temperature information related to various TCs). Thermal management advisor 420 may include a TC finder module 406. TC finder module 406 may communicate with scanning system interface 424, which may in turn communicate with a scanning system to receive data from various scanning accessories. The scanning accessories (e.g., accessories 320, 321, 322, 323 of FIG. 3A) may provide information about the location of various TCs to the TC finder module 406. The TC finder module 406 may perform various routines to align TC location information with a structural map of a repair area, for example, a structural map created or received by geometry generator module 408. In this respect, the repair advisor module may receive information about TC placement on a structural map of a repair area (e.g., of an aircraft component).

Thermal management advisor 420 may include a geometry generator module 408. Geometry generator module 408 may communicate with scanning system interface 424, which may in turn communicate with a scanning system to receive data from various scanning accessories. The scanning accessories (e.g., accessories 320, 321, 323, 324 of FIG. 3A) may provide information about a structural surface (e.g., variance in density, thermal mass and thickness) to the geometry generator module 408. The scanning accessories may provide structural information about the repair area (e.g., the sanded area), surrounding/underlying structure and/or backside structure. The scanning accessories may provide structural information about core of the structure and/or information about laminate layers on top of the core. The geometry generator module 408 may create a structural map from this information, for example, a 2D structural map. In some embodiments, the geometry generator module may receive the structural map from the scanning system/accessories. In some embodiments, if a scanning accessory takes several passes over a repair area in order to scan the entire repair area, the geometry generator module 408 may perform a routine to stitch or merger multiple structural maps into a single structural map of the repair area.

Various pieces of structural information may be sent to, stored by and/or analyzed by the repair advisor module 402. Various pieces of structural information may be displayed to a technician, for example, by display 426 and/or projector 408. Such information may show technician topographical or structural information about the actual repair field. Storing, analyzing and/or displaying such structural information about the repair field may aid inexperienced technicians in placing TCs, which may improve repair setup times, may result in higher quality cures, may result in fewer errors and fewer re-repairs and may reduce costs.

Thermal management advisor 420 may include a display generator 410. Display generator 410 may receive information from the repair advisor module 402 when the repair advisor module determines that it should display information to a technician. Display generator 410 may format display information from the repair advisor module 402 such that the display information may cause a connected display 426 and/or projector 408 to display information to the technician.

Thermal management advisor 420 may include a repair advisor module 402. Thermal management advisor 420 may include various routines, modules, methods, procedures, pieces of code, software or the like that are designed to analyze input information from various sources (e.g., TC data & control module 404, TC finder module 406 and geometry generator module 408) and generate advice, suggestions, guidance, warnings and the like related to a cured repair, e.g., a heat blanket (hot bond) repair. In some embodiments of the present disclosure, the repair advisor module 402 may include the bulk of the logic, routines, modules, methods, procedures and the like that adapt the thermal management advisor to analyze various inputs, determine various suggestions and cause various items to be displayed and/or projected. For example, many of the decisions, determinations, recommendations and the like that are shown in the flow charts of FIGS. 5A-5C may performed in the repair advisor module 402.

Certain embodiments of the present disclosure may be found in one or more methods for thermal management. With respect to the various methods described herein and depicted in associated figures, it should be understood that, in some embodiments, one or more of the steps described and/or depicted may be performed in a different order. Additionally, in some embodiments, a method may include more or less steps than are described and/or depicted.

FIG. 5A depicts a flow diagram 500 that shows example steps in a method for thermal management, in accordance with one or more embodiments of the present disclosure. More specifically, FIG. 5A shows example steps that may be performed leading up to a thermal survey being performed. As a preliminary step to the steps shown in FIG. 5A, the repair area may have been sanded down to remove layers of composite or metal, to expose and/or remove the defect. In this respect, the repair field may include the sanded area (e.g., the repair area) and the surrounding/underlying structure (e.g., of an aircraft component). In some embodiments, a geometry scan (e.g., an NDI inspection or a CCLA scan) may be performed to aid in sanding around the defect area. The geometry scan may inform a technician about the approximate depth of defect/damage). In some embodiments, the thermal management advisor may receive information from a geometry scan and advise a technician regarding how to sand. For example, the thermal management advisor may determine the area and amount of composite or metal material to be sanded away, for example, by multiplying the approximate depth of the defect by a diameter of the repair area (e.g., a suggested diameter for the size of the defect as determined from stored expert knowledge).

At step 502, the repair field may be marked, for example, by a technician. The repair field may be marked with stickers or fiducial markers, similarly to the manner shown in FIGS. 3C and 3D. Marking the repair filed may aid a geometry scanner in keeping track of the repair field, for example, if multiple passes of the scanner are used in order to scan the entire repair field. At step 504, the repair field may be scanned, for example, by a technician. A geometry scanner (e.g., a CCLA scanner) may be rolled or passed across the repair field. In some situations, the geometry scanner may take multiple passes over the repair field. At step 504, a structural map of the repair field may be created and/or received. The structural map of the repair field may include or indicate any fiducial markers or stickers that were present in the repair field when the geometry scanner scanned over the repair field. The structural map of the repair field may display structural information (e.g., density and/or thickness variances) at the repair area, in the surrounding/underlying structure, and optionally, structural information about the backside of the structure, e.g., the inner surface of an aircraft component. In some embodiments, a geometry scanner may be rolled or passed along the backside surface of the structure to acquire more detailed structural information.

Figure 6A:
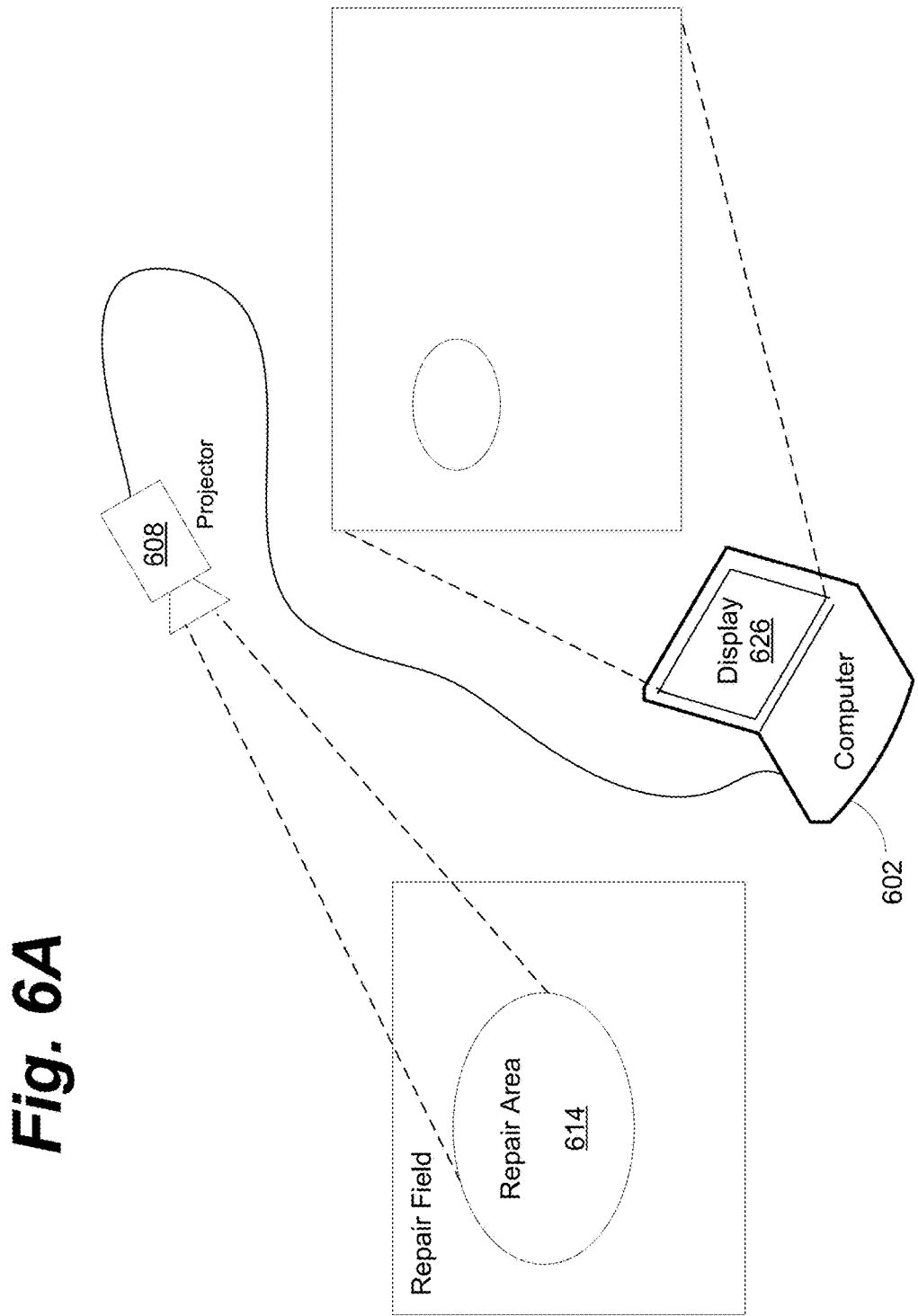
FIGS. 6A-6D depict examples of how various items may be displayed on a display and/or projected on the repair field, in accordance with one or more embodiments of the present disclosure.

At step 506, information about the repair field may be displayed and/or projected, for example, to a technician. For example, the repair area (e.g., the sanded area) may be displayed and/or projected, for example, such that a technician can confirm that the thermal management advisor has determined the correct size, location and orientation of the repair area. The thermal management advisor may have acquired such repair area information from a geography scan, for example. FIG. 6A shows an example of how the repair area may be displayed and/or projected. As can be seen in FIG. 6A, a computer 602 (e.g., the computer running the thermal management advisor) may cause a representation of the repair area to show on an integrated or connected display 626. As can be seen in FIG. 6A, computer 602 may cause a representation of the repair area to shine or illuminate on the actual repair area 614, for example, by communicating with a connected projector 608.

Figure 6B:
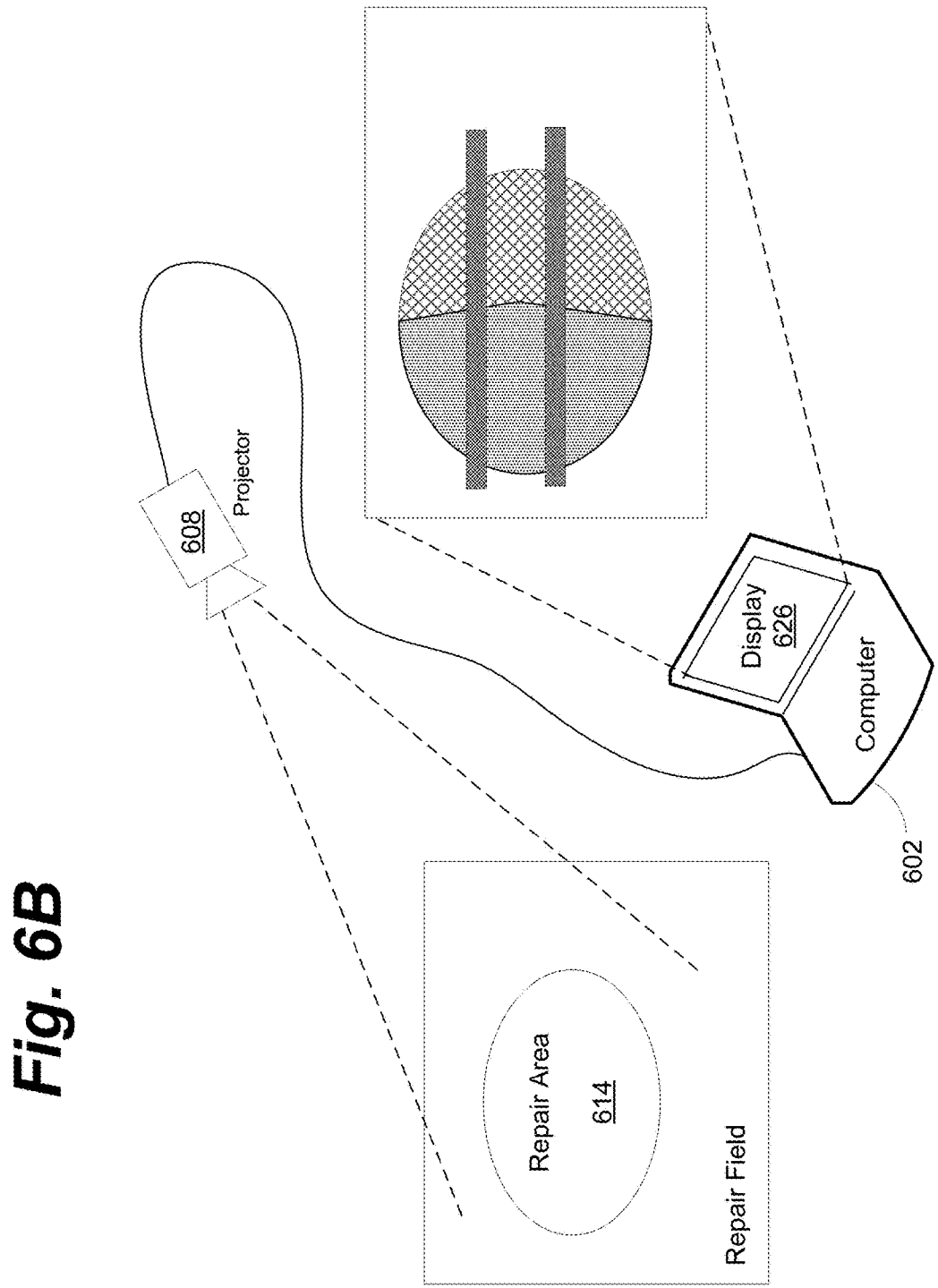

As another example of information about the repair field that may be displayed and/or projected at step 506, structural or topographical information about the repair field may be displayed and/or projected. The thermal management advisor may have acquired such structural information from a geography scan, for example. FIG. 6B shows an example of how the repair field may be displayed and/or projected. As can be seen in FIG. 6B, a computer 602 (e.g., the computer running the thermal management advisor) may cause a representation of the repair field to show on an integrated or connected display 626. As can be seen in FIG. 6B, computer 602 may cause a representation of the repair field to shine or illuminate on the actual repair area 614, for example, by communicating with a connected projector 608. It should be understood that even though FIG. 6B may not show actual variations in density, thickness, thermal mass and the like projected over the repair area 614, variations in density, thickness and the like may in fact be projected and illuminated on the actual repair area 614, in a similar manner to the way they are displayed on display 626. The representations of the repair field may use various colors and/or gradients of lighter to darker colors. For example, more dense or thick areas may show as darker color(s) and less dense areas may show as lighter color(s). For example, as can be seen in FIG. 6B, the representation of the repair area displayed on display 626 includes approximately half of the repair area as being darker than the other half. This may indicate that the darker half of the repair area is denser or thicker. In some examples, one or more gradients or rings of color and/or lightness/darkness could be used to show changes in density, thermal mass, thickness, etc. The representation of the repair field may show areas where other structural members are located. For example, the two horizontal bars displayed on display 626 may represent frame members, bars, IML stringers and the like that run through the structure or behind the structure. Displaying variances in density, thermal mass, thickness and the like may aid in determining which areas of the structure may act as a heat sink during the curing process, and may aid the thermal management advisor in determining where to place TCs. The thermal management advisor may generate and/or display warnings (e.g., to a technician) of areas in the repair field that could create heat sinks or other thermal managing problems.

At step 508, initial TC placements (e.g., locations in the repair field) may be recommended, e.g., to a technician. The thermal management advisor may receive and analyze information from a geometry generator (e.g., a structural or topographical map) to determine the size of the repair area and variance in the density, thermal mass, thickness and the like. Based on this analysis, the thermal management advisor may determine recommended placement of TCs (e.g., control TCs and/or monitoring TCs). An algorithm may be used to determine recommended placements, where the algorithm may utilize various rules and other information accumulated from expert knowledge and experience. For example, one rule may suggest placing at least one TC in each area of the thermal spectrum (e.g., thick areas, thin areas, areas with metal framing, etc.). Suggesting the placement of TCs may assure that all significant variances in material, thickness, density and the like of the structure are monitored during curing and/or a thermal survey. Such comprehensive monitoring may aid in predicting whether a final cure will be successful, which may reduce the time and cost associate with rework of repairs. Additionally, such suggestions may allow less experienced mechanics to take advantage of expert knowledge regarding thermal management.

Figure 6C:
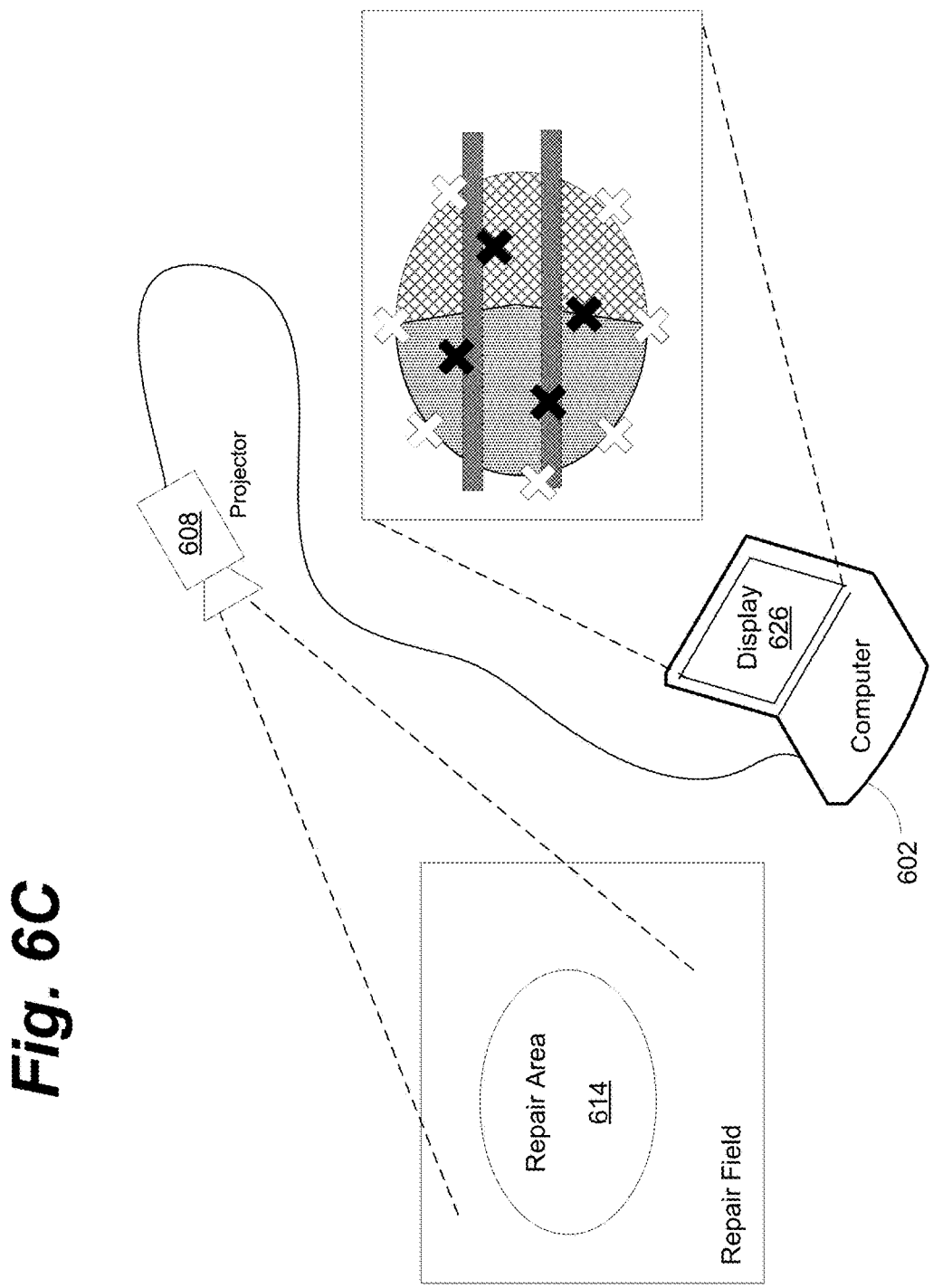

In order to recommend TC placement, the thermal management advisor may cause the suggested TC locations (e.g., temperature sensor indicators) to be displayed and/or projected. FIG. 6C shows an example of how the suggested TC placements (e.g., temperature sensor indicators) may be displayed and/or projected. As can be seen in FIG. 6C, a computer 602 (e.g., the computer running the thermal management advisor) may cause representations (e.g., X's) of suggested TC locations in the repair field to show on an integrated or connected display 626. As can be seen in FIG. 6C, a computer 602 may cause representations of suggested TC locations in the repair field to shine or illuminate on the actual repair area 614, for example, by communicating with a connected projector 608. It should be understood that even though FIG. 6C may not show actual X's projected over the repair area 614, X's may in fact be projected and illuminated on the actual repair area 614. As one example of suggested TC placement, FIG. 6C shows suggested control TC placements as white X's and suggested monitoring TC placements as black X's. In this example, it may be suggested that control TCs be placed primarily around the perimeter of the repair area and monitoring TCs be placed primarily within the perimeter of the repair area. Suggested placement of TCs may depend on information received from a geography scanner; for example, more TCs may be suggested in denser areas, and less TCs may be suggested in less dense areas. In some situations, the thermal management advisor may suggest placing TCs on the backside of the structure and repair area (e.g., inner surface of the aircraft component).

At some point (e.g., after step 508 and before step 510), a technician will place the actual TCs in and around the repair area. For example, the technician may place control TCs primarily around the perimeter of the repair area and may place monitoring TCs primarily within the perimeter of the repair area. As explained above, monitoring TCs may be placed under or above the patch (e.g., the test patch or surrogate patch using in thermal surveys). Some monitoring TCs may be embedded in a test patch, and are therefore placed when the test patch is placed over the repair area. In some situations, a technician may place TCs on the backside of the structure and repair area (e.g., inner surface of the aircraft component or fuselage).

At step 510, the actual locations of the TCs (e.g., as placed by a technician) may be detected. The thermal management advisor may communicate with the scanning system (including one or more scanning accessories) to detect the TC locations. As one example, a technician could use a geometry scanner to scan the repair field. This scan may be a different scan than the initial scan that aided in creating the structural map. Geometry scanners (e.g., CCLA scanners) may be capable of detecting TCs that are located in the repair field, including, for example, TCs that are not visible when viewing the repair setup. For example, geometry scanners may be capable of detecting TCs that are placed under or in a patch or TCs that are placed on the backside of the structure/repair area. Based on information from a geometry scan, the thermal management advisor may determine the location of various TCs, and may save or maintain these locations in the structural map.

In some embodiments of the present disclosure, it may be important for the thermal management advisor to know which specific TC numbers (e.g., 1, 2, 3, etc.) are associated with the TC locations, for example, as detected by a geometry scanner. For example, these TC numbers may be the same numbers that a hot bonder associates with the TCs. Knowing the relationship between the TC numbers (e.g., 1, 2, 3, etc.) and the location of the TCs may be important, for example, when receiving temperature information from TCs during a thermal survey and/or when suggesting particular regions near TCs to insulate. It may be the case that TC placement information received from a geometry scanner may show where various TCs are placed in the repair field, but the information may not associate each TC with a particular number. In this situation, additional steps may be performed such that the thermal management advisor and/or computer may receive information about specific numbers associated with TCs, for example, using a wand accessory to locate particular TCs, as is explained more below.

As one example of how TC numbers (e.g., 1, 2, 3, etc.) may be associated with TC locations, a radio frequency wand accessory (e.g., wand 322 of FIG. 3A) may be used. For example, a technician may move the tip of the radio frequency wand near the repair area. Then the technician (or a second technician near the computer) may interact with the thermal management advisor to cause an electrical signal to be sent to a particular TC (e.g., TC #1), and as a result, TC #1 may emit a radio frequency signal. The technician may then use the radio frequency wand to locate TC #1 in the repair area. For example, the wand may indicate (e.g., by light and/or sound) to the technician when it is close to TC #1. Once TC #1 is located in the repair area, the technician (or a second technician) may compare the TC #1 location in the actual repair field to the TC locations as maintained by the thermal management advisor (e.g., relative to the structural map). The technician or the second technician may then indicate which TC relative to the structural map is TC #1. This process may be repeated various other TC numbers (e.g., 2, 3, etc.), and the technician may assign all the appropriate TC numbers to the TC locations (e.g., relative to the structural map). In this respect, the thermal management advisor and/or computer may receive numbering information for each TC. In situations where TCs may be placed under a patch or on the backside of a structure, the radio frequency wand may still detect that it is close to a TC, and, in this respect, obscured TCs may be located and numbered. As one example of how TC numbers (e.g., 1, 2, 3, etc.) may be associated with TC locations, a hot/cool tip wand accessory (e.g., wand 322 of FIG. 3A) may be used. Most of the steps for assigning numbers using a hot/cool tip wand may be similar to those just described, but instead of sending electrical signals down TC's and detecting radio signals with the radio frequency wand, the hot/cool tip wand may cause a TC to heat up or cool down, and the thermal management advisor may receive information about which TC number is heating up or cooling down.

As one example of how TC numbers (e.g., 1, 2, 3, etc.) may be associated with TC locations, a geometry scanner (e.g., accessory 320 or 321 of FIG. 3A) may be used. For example, a technician may interact with the thermal management advisor to cause electrical signals to be sent to multiple TCs in a repair area concurrently. The signal sent to each TC/TC number may have a unique signal pattern or signature, which may cause each TC to emit a unique signal. While the TCs are each emitting unique signals, a technician may scan the geometry scanner over the repair area. The geometry scanner may be adapted to detect differences in the signals from each TC. The geometry scanner may then communicate unique information related to each TC to the thermal management advisor. For example, each TC could be indicated with a unique marker or icon, or a signature could be associated with each TC that is indicated on the structural map. The thermal management advisor may then match unique information for each detected TC to the unique signals sent to the TCs to assign TC numbers to the TC locations. Various other methods of assigning TC numbers to TC locations will become apparent after referencing this disclosure.

Figure 6D:
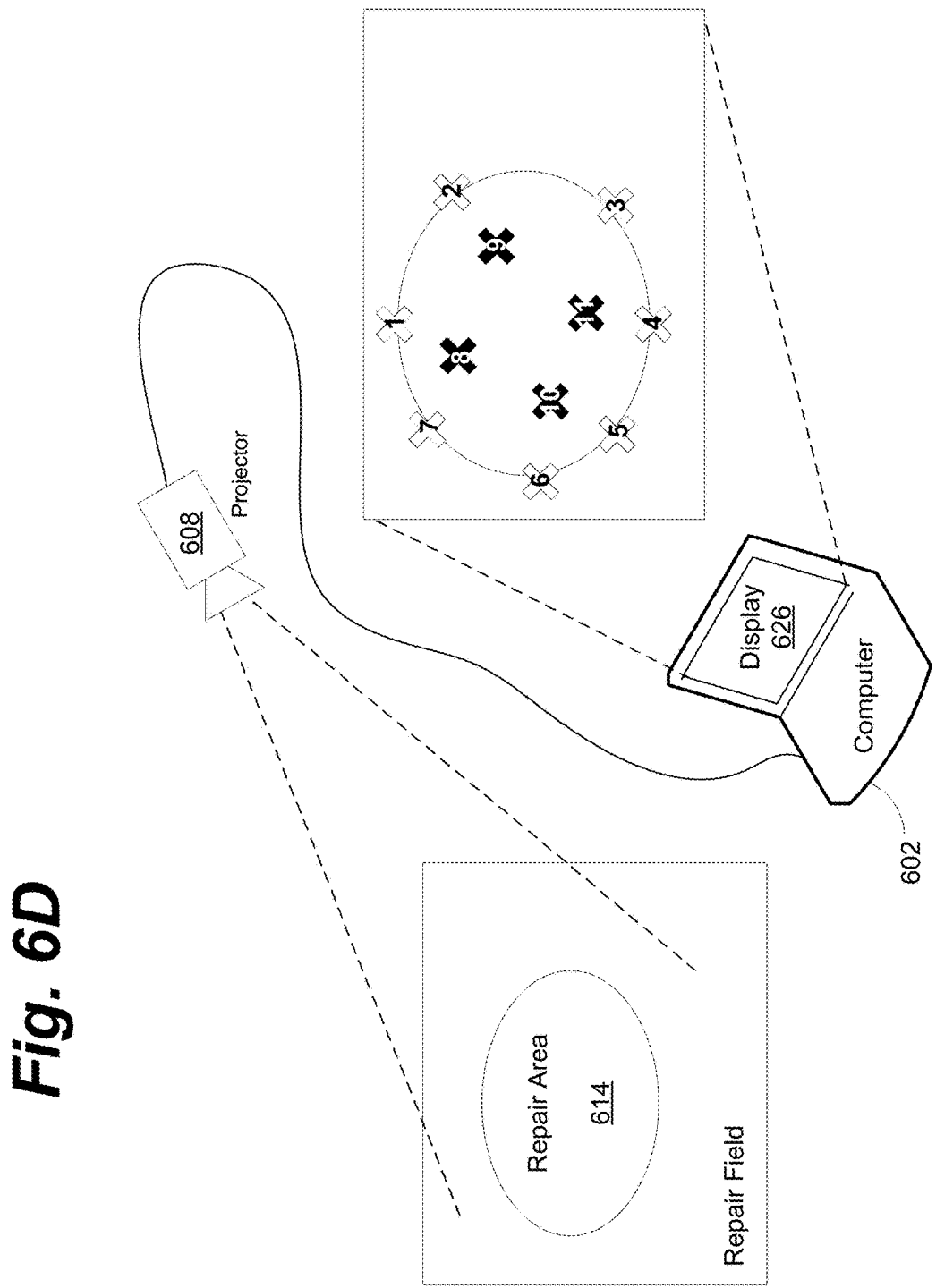

At step 510, the actual locations of the TCs (e.g., including each TC's number) may be displayed and/or projected, for example, such that a technician can confirm that each TC has been detected and numbered properly. FIG. 6D shows an example of how the actual TC locations and numbers may be displayed and/or projected. As can be seen in FIG. 6D, a computer 602 (e.g., the computer running the thermal management advisor) may cause representations (e.g., X's) of TC locations in the repair field to show on an integrated or connected display 626. As can be seen in FIG. 6D, a computer 602 may cause representations of suggested TC locations in the repair field to shine or illuminate on the actual repair area 614, for example, by communicating with a connected projector 608. It should be understood that even though FIG. 6D may not show actual X's projected over the repair area 614, X's (and numbers) may in fact be projected and illuminated on the actual repair area 614. As one example of actual TC locations and numbers, FIG. 6D shows control TC locations as white X's (numbered 1-7) and monitoring TC locations as black X's (numbered 8-11). In this respect, a technician may see TC locations and numbers, for example, both on the display 626 and projected directly onto the repair area. This may allow a technician to maintain traceability of the TCs as well as their numbers (e.g., their numbers as they are connected to the hot bonder).

Figure 7A:
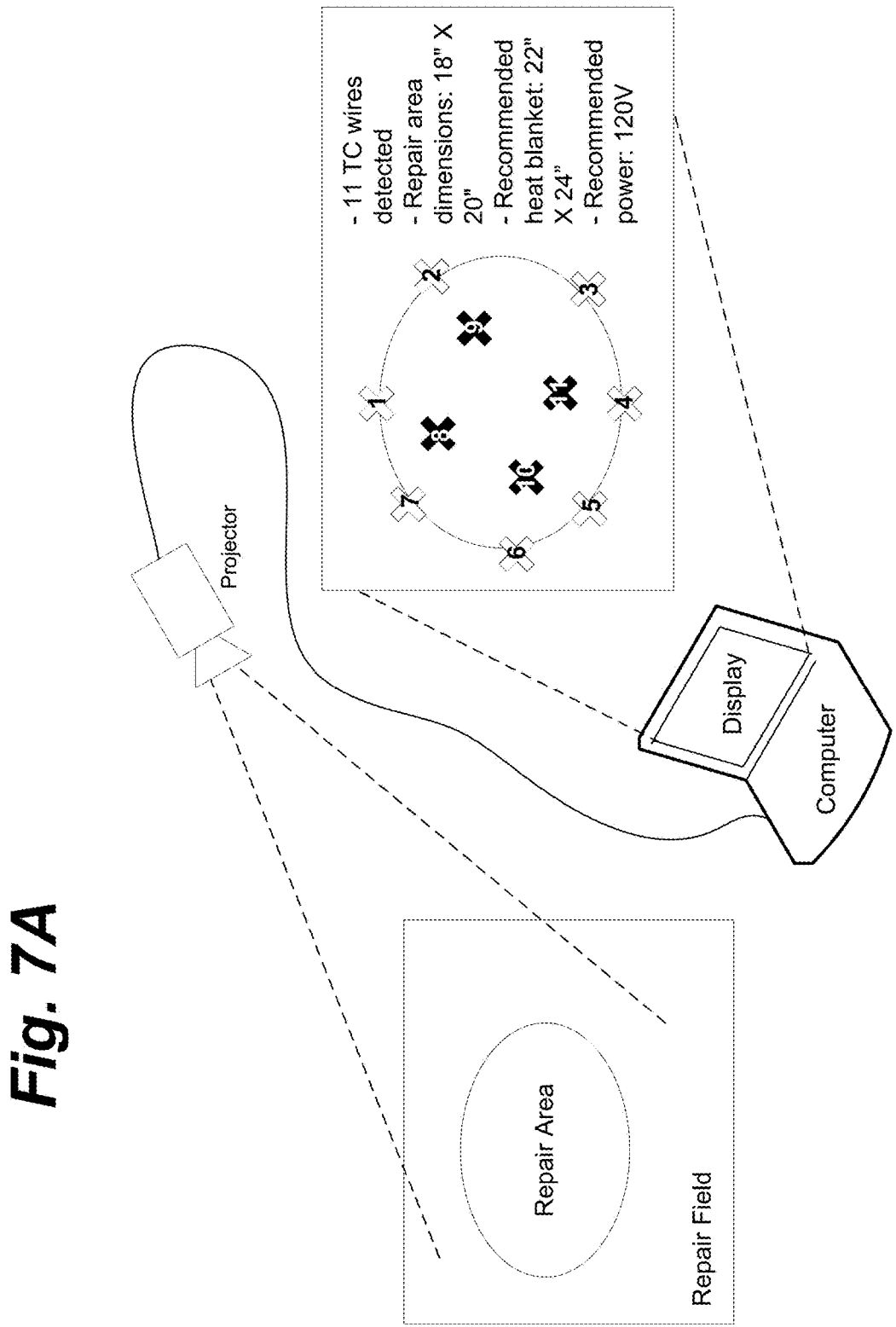
FIGS. 7A-7B depict examples of how various items may be displayed on a display and/or projected on the repair field, in accordance with one or more embodiments of the present disclosure.

At step 512, the thermal management advisor and/or computer may analyze the TCs locations, the structural map, and optionally other information and may recommend heat blanket information, for example, to a technician. The thermal management advisor may determine the size (e.g., the dimensions) of the repair area, and may suggest a particular size (e.g., the square inches) of heat blanket appropriate for the repair setup. An appropriate heat blanket may be large enough to cover the repair setup, but not too large such that it overheats the repair field, potentially burning the structure. The thermal management advisor may determine power supply requirements that are optimal to heat the recommended size of blanket. Various pieces of information related to the repair setup (e.g., including heat blanket recommendations) may be displayed and/or projected to a technician. FIG. 7A shows an example of how various pieces of information may be displayed and/or projected. As can be seen in FIG. 7A, after analyzing the TCs locations, the structural map, and optionally other information, the thermal management advisor detected 11 TC wires and a repair area with dimensions of 18" by 20". The thermal management advisor then recommended a heat blanket with dimensions of 22" by 24" and a power supply output of 120 volts. It should be understood that the example of FIG. 7A (and other examples herein) recommends a rectangular shaped heat blanket; however, heat blankets may come in other shapes, such as circles or ovals.

At some point (e.g., after step 512 and before step 514), a technician may select a heat blanket of a particular size and with a particular power. The technician may then interact with the computer (e.g., the computer running the thermal management advisor) to enter data related to the actual heat blanket used. For example, the technician may enter the size of the heat blanket and the power used.

At some point (e.g., after step 512 and before step 514), a technician may interact with the computer and/or the thermal management advisor to enter other curing data related to the repair setup. For example, a technician may enter data related to a target curing profile (e.g., including a set point, plus/minus tolerances, etc.). The term target curing profile may refer to the heating changes that the repair area should ideally go through in order for the repair patch to bond adequately to the repair area. The thermal management advisor may receive this target curing data and may store this data for future use. For example, the thermal management advisor may use this curing data to determine whether a thermal survey succeeded (e.g., all TCs were within acceptable ranges). At this point or at a different point, a technician may also interact with the hot bonder to enter information about an actual curing profile that should be used. The term actual curing profile may refer to the heating power changes that the hot bonder goes through to control the heat blanket. The term set point may refer to a final or maximum temperature during a curing profile. As one example of a curing profile, the temperature may rise at a particular rate (e.g., 3 degrees per minute) and may max out at a maximum temperature of 350 degrees (e.g., 350 is the set point). The temperature may then be held at the set point (e.g., 350 degrees) for a period of time (e.g., 180 minutes). The temperature may then lower at a particular rate (e.g., 3 degrees per minute) down to an end temperature (e.g., 140 degrees). At this point, the cure may be ended.

At step 514, the thermal management advisor may receive information about the actual heat blanket that is used (or will be used), for example, information entered by a technician. The thermal management advisor may store this information for future use. The thermal management advisor may analyze the entered heat blanket information, and optionally other information. Other information may include previously entered and/or detected information about the repair setup, for example, the dimensional size of the repair area. The thermal management advisor may determine various warnings and/or recommendations. For example, the thermal management advisor may determine that the heat blanket is oversized. If the heat blanket may potentially work for the curing setup, the thermal management advisor may suggest additional TCs to be placed near the repair area, for example, in the excess heat blanket areas that stretch significantly beyond the repair area. The thermal management advisor may also determine whether the heat blanket is undersized. If the heat blanket is not appropriate for the repair setup, the thermal management advisor may determine that a different blanket should be used. As another example, the thermal management advisor may determine that a particular power supply (e.g., 220 volts) should be used with the particular size of heat blanket. In some examples, the thermal management advisor may determine that a single zone heat blanket may not work for the current repair setup, and may determine that a multi-zone heat blanket should be used.

The thermal management advisor may display and/or project the various warnings and/or recommendations, for example, to convey the information to a technician. FIG. 7A shows an example of how various pieces of information may be displayed and/or projected. As can be seen in FIG. 7A, after analyzing the entered heat blanket information, and optionally other information, the thermal management advisor received information about a heat blanket with dimensions of 24" by 36". The thermal management advisor then displayed (e.g., caused to be displayed) a warning that the heat blanket is oversized. The thermal management advisor then displayed various suggestions, for example, to use additional TCs (e.g., TC numbers 12, 13, 14, 15). The thermal management advisor also suggested using a 220 volt power supply. The thermal management advisor may display and/or project information regarding how to properly place (e.g., location and alignment) the heat blanket over the repair area. In some examples, an accessory of the scanning system (e.g. a camera) may view the repair area and transmit information to the thermal management advisor regarding the location and orientation of the heat blanket. The thermal management advisor may inform the technician if the heat blanket placement should be altered.

As another example of various warnings and/or recommendations that may be determined by the thermal management advisor and displayed and/or projected to the technician, the thermal management advisor may determine which heat blanket control method should be used. The heat blanket control method may refer to the method that a hot bonder uses to determine the power level (e.g., hotter or colder) to be sent to the heat blanket, based on temperature data from various TCs. As one example, the hot bonder may determine an average temperature reading from all the TCs, and may use that to adjust its power sent to the heat blanket. Other control methods may use the hottest TC or coolest TC. Various other methods will become apparent after referencing this disclosure. The thermal management advisor may recommend a heat blanket control method based on information about the actual heat blanket that will be used, and optionally other information such as the structural or topographical map of the repair field. The technician may configure the hot bonder to use the suggested heat blanket control method. In some examples, the control method logic/circuitry may be located in the heat blanket.

After the various warnings and/or recommendations are displayed, the thermal management advisor may provide the technician an opportunity to alter the repair setup (e.g., the heat blanket) and enter new information. Once the thermal management advisor determines that the heat blanket is appropriate, the method may proceed to the next step. Ensuring that proper heat blankets are used for the curing process may save cost and time that may be associated with using inadequate heat blankets. Inadequate heat blankets may prevent adequate curing and/or may damage the repair area and the surrounding structure. According to some repair data, over and under sized heat blankets used in the field are a leading reason for failed repairs. The thermal management advisor may aid a technician to identify any heat blanket issues (e.g., wrong-sizing issues) before any damage is caused to the structure, and may guide the technician to select and/or place an appropriate heat blanket.

At step 516, a technician may finish prepping the repair setup, for example, based on the various suggestions and/or warnings determined and/or displayed by the thermal management advisor. The technician may place the heat blanket over the repair area. The technician may then bag the repair setup to prepare for a thermal survey (step 518). In some setup examples, a heat blanket may be placed on the backside of the structure, for example, to improve the heating uniformity.

In some embodiments of the present disclosure, a display and/or projector may be used to present guidance to a technician regarding the placement of various items during the repair setup. In some embodiments, the display and/or projector may show sequential steps that guide a technician step-by-step to place item in the correct area. The thermal management advisor may provide placement recommendations (e.g., sequential step-by-step) regarding items such as TCs, the patch (e.g., test patch or repair patch), the heat blanket, bagging materials, insulation and any other items (e.g., adhesives, films, etc.) that are recommended be placed for the repair setup. Progressive images may be presented to a technician (e.g., on the display or projected directly onto the repair field) to guide the technician regarding what steps to take at various points during each phase of the repair (e.g., preparation, thermal survey, final cure).

At this point, even though most or all of the TCs may be covered up or obscured by the heat blanket, a technician may still be able to trace the location of the TCs. The thermal management advisor may cause the TC locations to be displayed on the display of the computer (e.g., display 626) and/or projected (e.g., by projector 608) onto the repair area. This display/projection of the TCs may be important, for example, to guide a technician to add insulation during the thermal survey and/or during the final cure.

Figure 5B:
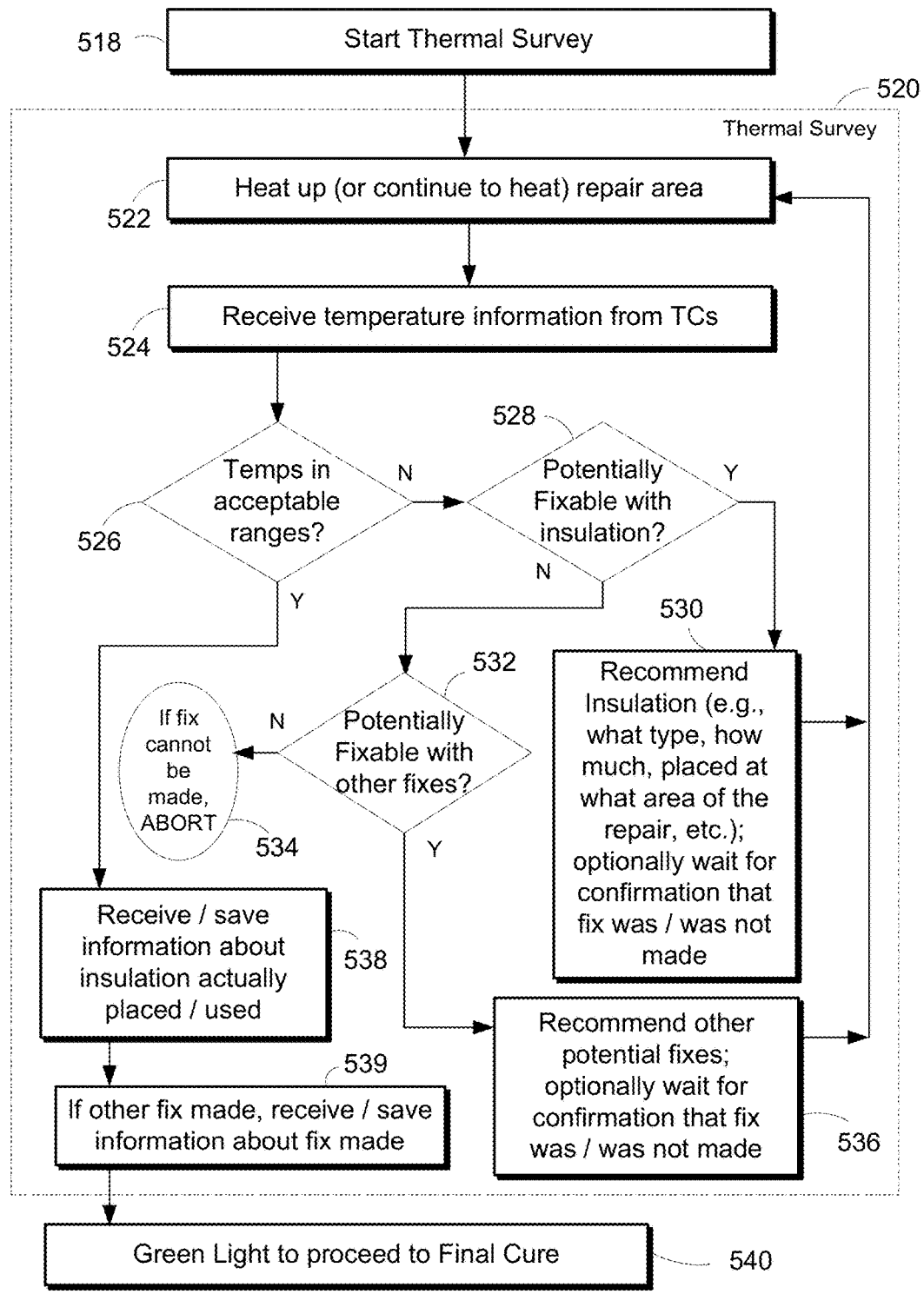

FIG. 5B depicts a flow diagram 501 that shows example steps in a method for thermal management, in accordance with one or more embodiments of the present disclosure. More specifically, FIG. 5B shows example steps that may be performed during one or more thermal surveys. At step 518, the thermal survey may be ready to start. For example, all of the preparation steps performed before the thermal survey may have been completed, for example, the preparation steps described with regard to FIG. 5A.

The thermal survey may begin as indicated generally by number 520. The thermal survey may include various steps. At step 522, the repair field may be heated up, for example, following a specified actual curing profile as described above. The temperature of the repair field may be ramped up to a set point (e.g., 350 degrees). In order to heat up the repair field, a technician may interact with the hot bonder, which in turn indicates to the heat blanket that it should heat up. During the ramp up in temperature, the TCs (e.g., control TCs and monitoring TCs) will communicate temperature information regarding the temperature at various areas around the repair area. The hot bonder may use temperature information from the control TCs to alter the heating data sent to the heat blanket.

As explained above, it may be useful to dry the structure to allow for a good bond with the repair patch during the final curing process. In order to dry the structure, a repair area drying (e.g., a "dry cycle moisture removal") may be performed before the final curing process is performed. The repair area drying may be performed by heating the repair area up to a certain temperature for a period of time. In some situations, the repair area drying may be performed at the same time that the thermal survey is being performed.

At step 524, the thermal management advisor may receive temperature information from the TCs. For example, the thermal management advisor may communicate with a junction box (and junction box interface) to receive signals from the TCs. The thermal management advisor may monitor the temperature readings from the TCs to determine whether the TCs rise to or stay in acceptable temperature ranges during the temperature ramp-up and once the set point temperature is reached. Step 526 may indicate a check that is performed at various times during the temperature ramp-up and once the set point temperature is reached. At step 526, the thermal management advisor may determine whether all the TC readings are within acceptable ranges. For example, the thermal management advisor may determine whether TCs are too hot, too cold or whether their rate of temperature change is too high. If all the TC readings are at acceptable ranges and the thermal survey has cycled through the entire curing profile, then the repair setup may be acceptable, in which case, the thermal management advisor may indicated that the final cure may be performed (step 540).

At step 528, if one or more TC readings are not within acceptable ranges, the thermal management advisor may determine whether the problem may potentially be fixed by applying or removing insulation. In some embodiments of the present disclosure, the thermal management advisor may provide insulation recommendations before the thermal survey begins (e.g., before step 522). The thermal management advisor may determine these recommendations by analyzing the structural or topographical map (e.g., generated by scanning the structure with a geometry scanner) to predicts hot and/or cold zones, for example, from the variances in thicknesses, density, thermal mass, etc. If the TC reading problems may potentially be fixed by applying or removing insulation, then the thermal management advisor may perform various routines to determine one or more insulation recommendations (step 530). For example, the thermal management advisor may determine what type of insulation, how much and where it should be placed or removed from in the repair field. These determinations of insulation recommendations may be determined based on accumulated expert knowledge and experience regarding what insulation configurations work well to fix particular types of heating issues. Expert knowledge may include information about how to insulate a repair field that is experiencing particular heating issues, to bring the TCs within acceptable tolerances. These determinations may use the structural or topographical map that was constructed with a geometry scanner during the preparation steps.

Figure 8:
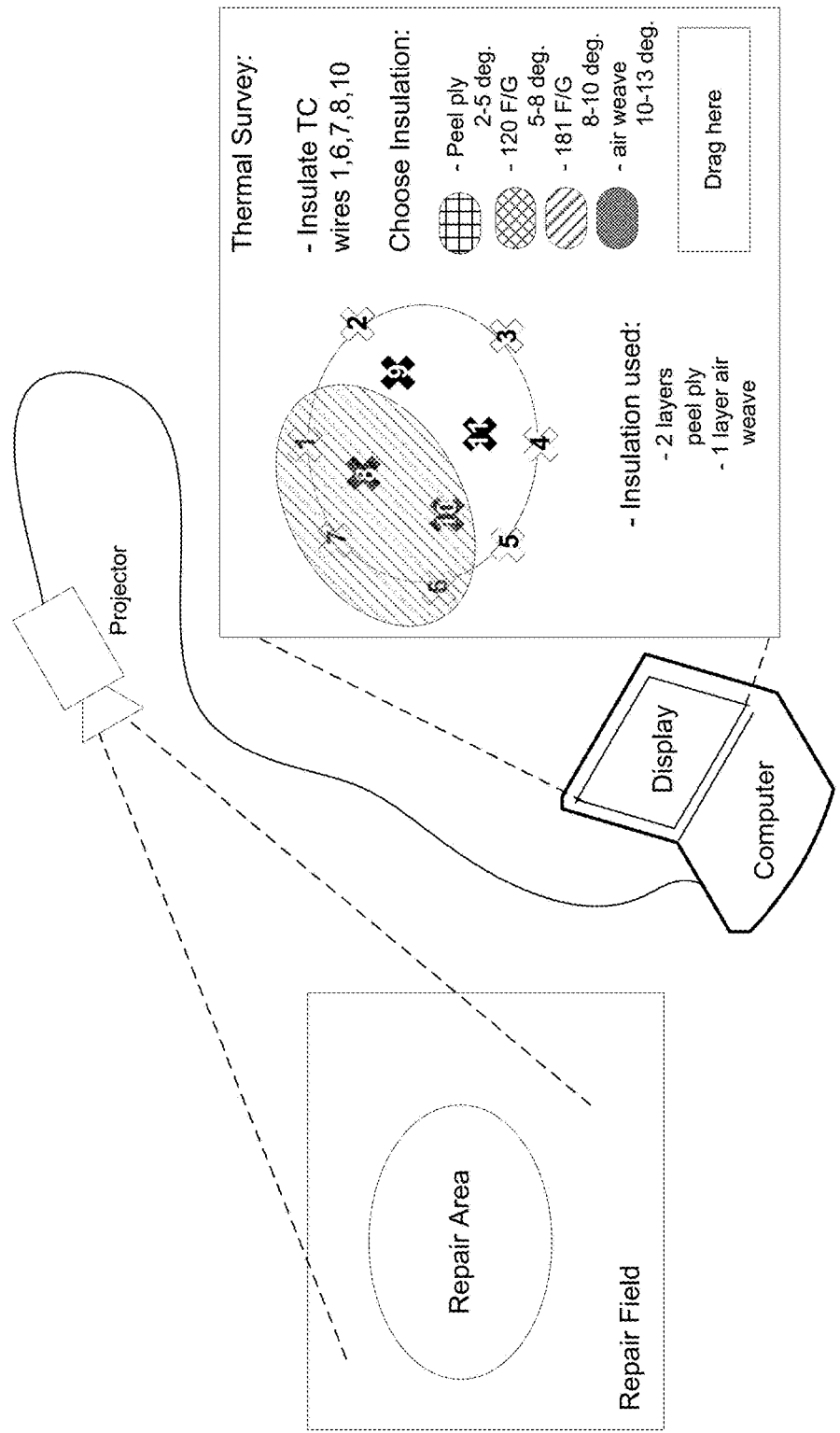
FIG. 8 depicts an example of how various items may be displayed on a display and/or projected on the repair field, in accordance with one or more embodiments of the present disclosure.

The thermal management advisor may then cause insulation recommendations to be displayed and/or projected, for example, to give recommendations to a technician on ideal placement of insulation. FIG. 8 shows one example of how insulation recommendations may be displayed and/or projected. As can be seen in FIG. 8, the display of the computer indicates that the thermal survey has begun. Based on various pieces of information (e.g., TC temperatures, expert knowledge, the structural map, etc.) the thermal management advisor recommended that the areas near TCs 1, 6, 7, 8, 10 be insulated. The display and/or the projector may show a technician the areas of the repair field to place insulation based on these TC readings. In some embodiments, the thermal management advisor may advise what type of insulation to use and how much. In this respect, the thermal management advisor may provide in-situ (i.e., "in position") suggestions on proper insulation (e.g., the insulation pattern, thickness, types, etc.).

At some point (e.g., after step 530 and before step 532), a technician may place insulation at or around the repair field. For example, a technician may follow the suggestions as provided by the thermal management advisor. As a particular example, a technician may place insulation on top of the repair setup, for example, on top of the bag that seals the heat blanket, near particular TCs that are having heating issues. In some situations, a technician may place insulation on the back side of the aircraft component (e.g., a fuselage section). Generally, insulation may be placed over or around areas that are running cool, and the insulation may cause the area to retain more heat thereby increasing or holding the temperature of that area.

In some situations, it may be important for a technician to locate particular TCs by their TC numbers (e.g., 1, 2, 3, etc.), for example, because the thermal management advisor may suggest placing insulation around a particular TC number. In these situations, various devices connected to the computer (e.g., the computer running the thermal management advisor) may aid a technician in locating TC numbers and/or placing the insulation. As one example, a projector (e.g., the projector shown in FIG. 8) may shine and/or illuminate TC locations and numbers directly onto the repair area. In some examples, the projector may also shine and/or illuminate areas on the repair field that represent suggested insulations placements. As another example, a technician may use a scanning accessory (e.g., part of the scanning system) to locate particular TCs. For example a technician may use a wand accessory (e.g., similar to wand 322 of FIG. 3A) to locate particular TCs by moving a tip of the wand close to the TC. When the wand tip moves close a particular TC, for example, the thermal management advisor may cause the particular TC to display and/or project such that the technician can confirm the TC location. A wand accessory may also be used to locate TC's while scanning from the backside of the structure. For example, if a technician plans to place insulation on the backside of a structure, he may move a wand around the backside, and the wand may be capable of detecting TC locations, even if the TCs are located on the front side of the structure. In some situations, there may be a maximum amount of insulation allowed to be placed on the front side of the repair, and thus additional insulation may have to be placed on the backside.

Returning to FIG. 5B, once the technician places insulation and indicates the insulation used to the thermal management advisor, the thermal survey 520 may return to step 522. The heating of the repair area may continue or be maintained, and the thermal management advisor may again check the TC temperature readings (step 526). This cycle (e.g., insulate and recheck) may continue until all the TCs are in acceptable ranges.

In some situations, the thermal management advisor may determine that a TC temperature issue cannot be fixed with insulation alone (step 528), or for some other reason, recommendations should be made other than insulation recommendations. At step 532, the thermal management advisor may determine whether a TC temperature issue may be fixed with other non-insulation type fixes. If the thermal management advisor determines that non-insulation type fixes cannot fix the heat issue, the thermal management advisor may suggest that the thermal survey be aborted (step 534). As one specific example of a non-insulation type fix, the heat blanket may not be placed properly. As another specific example, a TC may be indicating a cold, out-of tolerance region of the repair. Past history and experience may show that technicians may tend to over-insulate the area near the TC to try and bring it into tolerance, even if it may be more appropriate to investigate why the TC is indicating cool temperatures. Over insulation may lead to burning through the structure (e.g. composite or metal) causing further damage to the repair field and increased repair sizes. The thermal management advisor may include one or more routines that perform smart diagnosis of hot/cool spots, for example, based on various pieces of information such as expert knowledge, experience, the structural map and the like.

At step 536, the thermal management advisor may recommend other potential fixes that a technician may consider. For example, the thermal management advisor may recognize that a particular TC is indicating such a cold reading that the thermal management advisor may instruct the technician to not over-insulate, and/or may provide recommendations on what may be causing the wire to run cold and how to correct the problem. For example, the thermal management advisor may recommend that the technician check the location/placement of the TC that is running cool. The thermal management advisor may recommend verifying that the TC is placed inside the heat blanket, for example, by a minimum of two inches. The thermal management advisor may recommend moving or removing one or more TCs. The thermal management advisor may recommend running diagnostics on the TC to make sure that the TC is not dead, broken or malfunctioning. In some situations, the thermal management advisor may determine that the heat blanket is in some way inadequate for the repair and/or may suggest a multi-zone heat blanket. In some situations, the thermal management advisor may recommend considering raising or lowering the set point for the actual curing profile. In order to generate these recommendations, the thermal management advisor may reference a store of information that uses expert knowledge and experience related to known heating problems.

As another specific example of a non-insulation recommendation, the thermal management advisor may recommend that one or more TCs should be heat synched. In general, heat synching a TC causes heat to be pulled or directed away from the TC and/or the repair area near the TC. A TC may be heat synched in a variety of ways. For example, a heat sync pouch, where the pouch is made of material that may absorb or draw away heat, may be placed over the area requiring heat reduction. Other heat syncs are possible, for example, pieces of metal, tubing or any other material that is adapted to draw heat away from an area. As another specific example of a non-insulation recommendation, the thermal management advisor may recommend that one or more TCs should be heat synched, as described above. As another specific example of a non-insulation recommendation, the thermal management advisor may recommend altering the heat blanket control method (e.g., which TC(s) determine the power level sent to the heat blanket) as described above. As another specific example of a non-insulation recommendation, the thermal management advisor may recommend altering the actual curing profile used by the hot bonder, for example, to help bring all TCs within temperature tolerances. In some examples, a hot bonder may allow a technician to change the heat blanket control method and/or the hot bonder's actual curing profile on the fly, for example, without ending the cure. In some embodiments, thermal management advisor merely recommends changes that a technician can enter into the hot bonder. In other embodiments, the computer and/or thermal management advisor may communicate with the hot bonder to automatically make these changes.

At step 536, the thermal management advisor may provide a technician with an opportunity to follow suggestions provided by the thermal management advisor. The thermal management advisor may wait for confirmation from the technician that the suggested fix was made. If the technician is unable to confirm that the suggested fix was made, the thermal management advisor may recommend ending or aborting the thermal survey (step 534). Once the technician performs the recommended fix and indicates that the fix was performed (e.g., to the thermal management advisor), the thermal management advisor may wait or delay for a period of time, for example, to allow the fix (e.g., added insulation) to take effect on the TC temperature readings. Then, the thermal survey 520 may return to step 522. The heating of the repair area may continue or be maintained, and the thermal management advisor may again check the TC temperature readings (step 526). This cycle (e.g., insulate and/or fix and recheck) may continue until all the TCs are in acceptable ranges. Once all TCs are in acceptable ranges, the final cure may begin (e.g., step 540).

Once the thermal management advisor gives the green light to proceed with the final cure (e.g., step 540) or before it gives the green light, the thermal management advisor may save information about various fixes that were used to bring the TCs within acceptable temperature ranges. For example, at step 538, the thermal management advisor may receive information about the insulation actually placed by the technician. The technician may interact with the computer (e.g., the computer shown in FIG. 8) to enter information about the insulation placed. Referring to FIG. 8, the display of the computer shows various insulation options that the technician could chose to use (e.g., peel ply, 120 F/G, 181 F/G, air weave). The display may also show an estimated temperature savings associated with each type of insulation. The technician may then indicate which type of insulation was used. For example, the technician may select or indicate an area of the repair field. The technician may then select (e.g., click) an indicator (e.g., see the ovals associated with each insulation type) related to the insulation used and may drag the indicator into a drag/drop area. The display of the computer may then confirm which insulation was selected/entered. In some situations, multiple layers of insulation (e.g., layers of different types of insulation) may be applied to a single area. As an example of technician input, a technician may drag and drop multiple insulation indicators to indicate placement of multiple layers of insulation. The thermal management advisor may save information related to insulation used (e.g., in an insulation log file). This information may then be used (e.g., suggested to a technician) to suggest insulation to pre-insulate the final cure. Saving insulation information may be useful in a variety of situations. For example, if a first technician prepped the repair area and ran a successful thermal survey before the first shift ended, a second technician may pick up where the first technician left off, and the second technician may know how to place initial insulation for the stat of the final cure.

As another example, at step 539, if other non-insulation type fixes were made (e.g., if a technician confirmed that suggested non-insulation type fixes were made), the thermal management advisor may receive and/or save information related to the fix that was made. The technician may interact with the computer (e.g., the computer shown in FIG. 8) to enter information about the fix performed. This saved information may be used at the time of the final cure to instruct a technician on how to prepare the repair setup for the final cure.

Figure 5C:
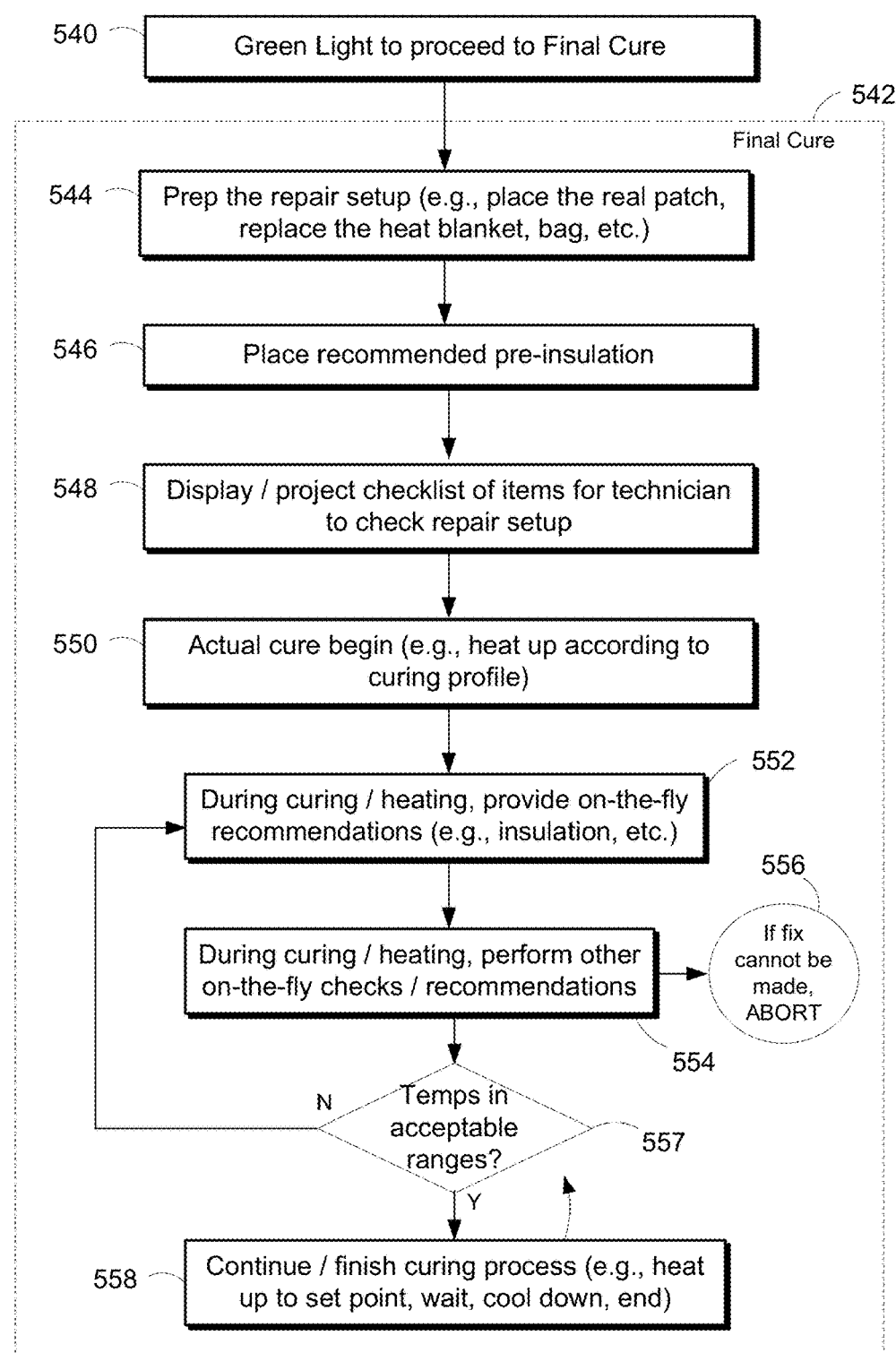

FIG. 5C depicts a flow diagram 503 that shows example steps in a method for thermal management, in accordance with one or more embodiments of the present disclosure. More specifically, FIG. 5C shows example steps that may be performed during a final curing process. At step 540, the final curing process may be ready to start. For example, all of the TCs may have been in acceptable ranges during the thermal survey, e.g., as described with regard to FIG. 5B.

Figure 7B:
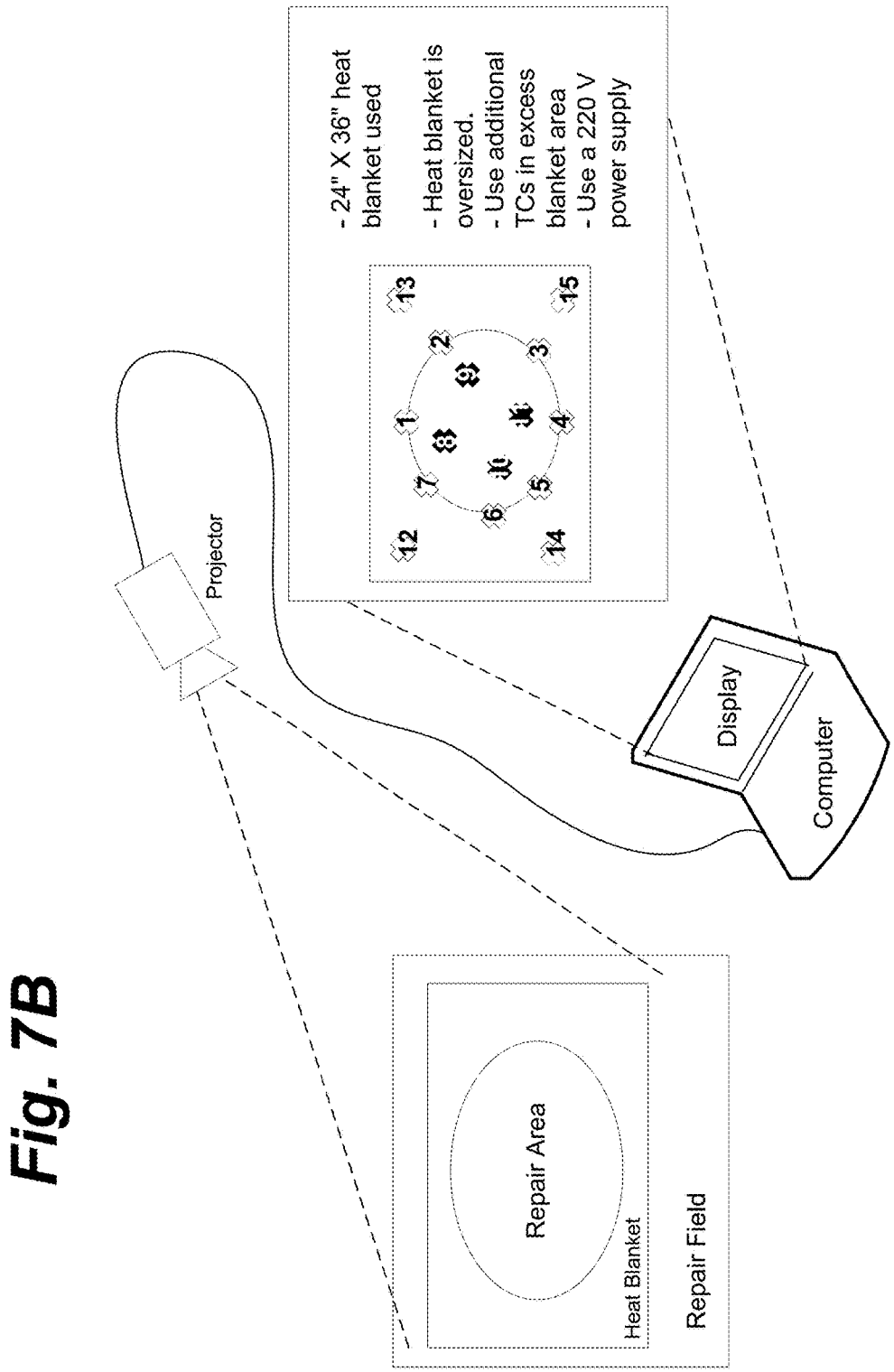

The final curing process may begin as indicated generally by number 542. The final curing process may include various steps. At step 544, a technician may prepare the repair setup for the final cure. For example, the test patch may be removed and the repair patch (e.g., made of composite or metal) may be placed, e.g., in the same location/orientation as the test patch. Monitoring TCs may be removed from the repair area (leaving control TCs around the perimeter of the repair area). The heat blanket may be replaced over the repair patch and repair area, and the repair setup may be re-bagged. In some setup examples, a heat blanket may be placed on the backside of the structure, for example, to improve the heating uniformity. The thermal management advisor may provide recommendations or requirements to the technician regarding various aspects of preparation. For example, the thermal management advisor may remind the technician of the proper placement of the control TCs. As another example, the thermal management advisor may remind the technician of the proper size, power and placement of the heat blanket. As another example, the thermal management advisor may recommend the proper placement of insulation over the repair. In order to provide these reminders, the thermal management advisor may display and/or project information (e.g., similar to the manner shown and described with regard to FIG. 7B). In this respect, a technician may see precise placement information, for example, projected right onto the actual repair field.

At step 546, the thermal management advisor may provide recommendations or requirements to the technician regarding insulation that should be placed before the cure starts. In order to provide these recommendations or requirements, the thermal management advisor may recall information (e.g., stored or saved information) about insulation placed during the thermal survey. At this point, the repair setup may be finally bagged for the cure (e.g., with the heat blanket and bag materials placed over the repair area). Therefore, visibility of the repair area (including TCs) may be obscured. Thermal management advisor may display and/or project information about TC locations, for example, in a manner similar to that shown and explained in relation to FIG. 6D. In this respect, even if the repair area and TCs are obscured, a technician may see information (e.g., projected directly onto the repair setup) about where particular TCs are located, so the technician may place insulation as recommended. In some embodiments, the thermal management advisor may project areas onto the repair setup that indicate suggested areas that should be insulated. The technician may then reference the displayed/projected TC locations (and/or insulation areas), and may place the insulation. Because the recommended insulation is clearly displayed/projected to the technician, rework repairs may be avoided by placing the insulation correctly at the outset. This may also reduce the altering of insulation during the cure.

At step 548, the thermal management advisor may display and/or project a checklist of setup items, for example, such that the technician can check various setup items related to the repair setup, before proceeding with the actual curing (e.g., pushing a button to start cure). Examples of checklist items include: (1) Is heat blanket extended X (e.g., 2) inches minimum beyond all TC wires? (2) Is the hot bonder power source plugged into an outlet identified as "do not unplug"? (3) Are all plug connections secure so that they do not accidently come unplugged during the cure? (4) Are all flammable materials removed from the heat source? (5) Is recommended pre-insulation in place? (6) Do you have extra insulation materials on hand if recommended during the cure? Various other checklist items may become apparent after referencing this disclosure. Such a checklist may be important because it may increase the success rate on first time curing attempts and it may improve the quality of the cure. A checklist may also decrease the time for a cure because check points will not be missed that may delay or stop a cure start. Once the repair setup is prepped, the final curing process may proceed.

Figure 9A:
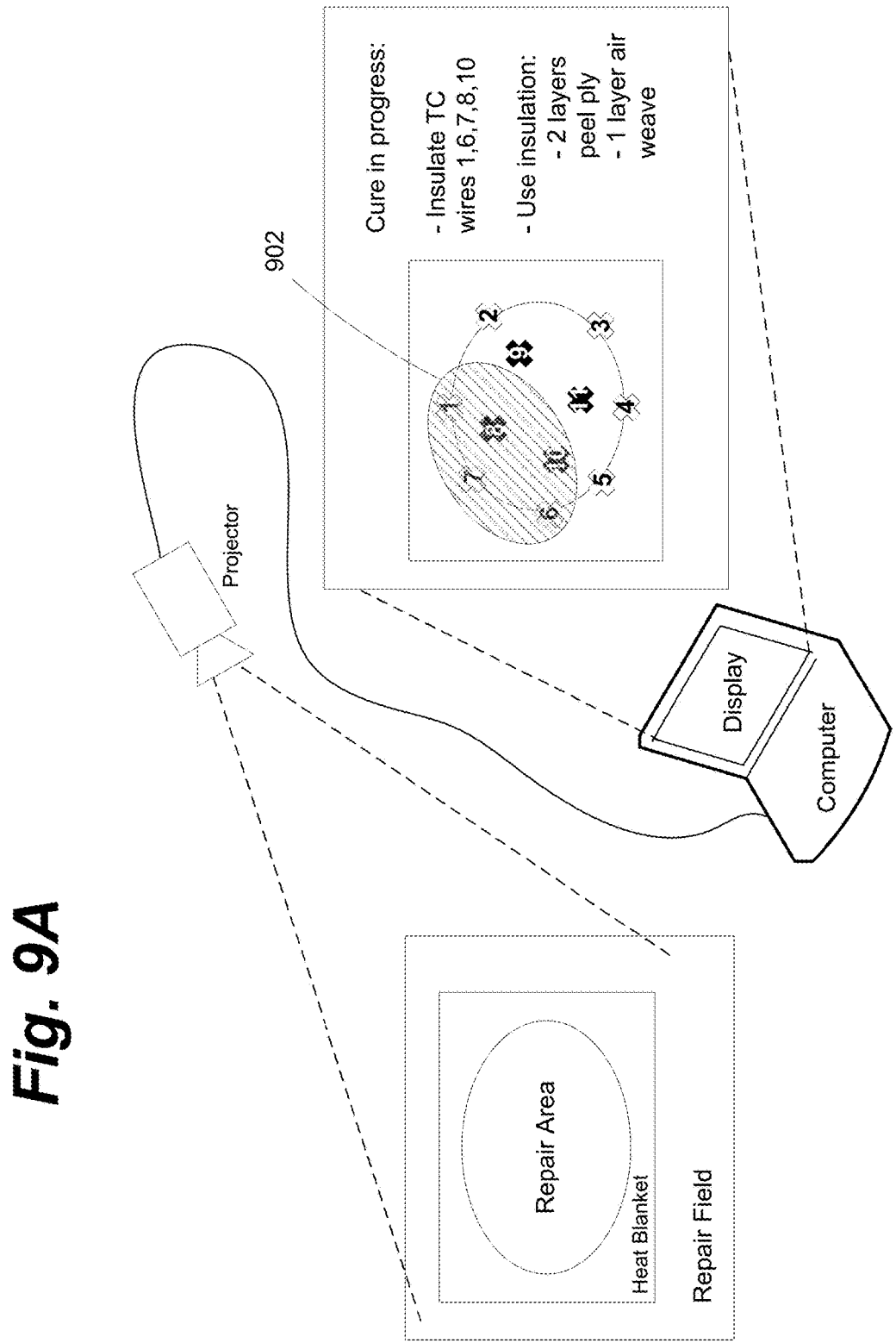
FIGS. 9A-9C depict examples of how various items may be displayed on a display and/or projected on the repair field, in accordance with one or more embodiments of the present disclosure.
Figure 9B:
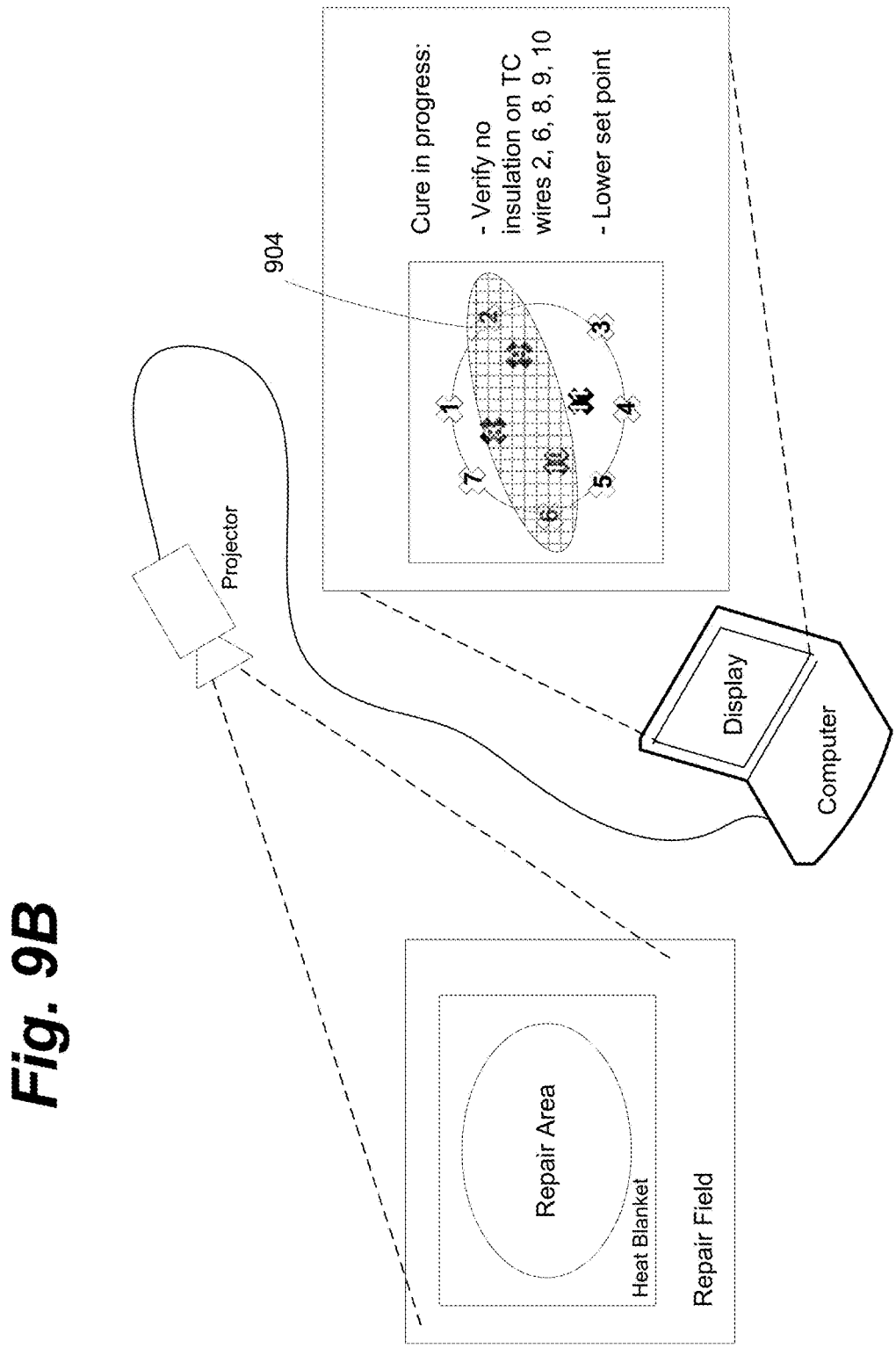
Figure 9C:
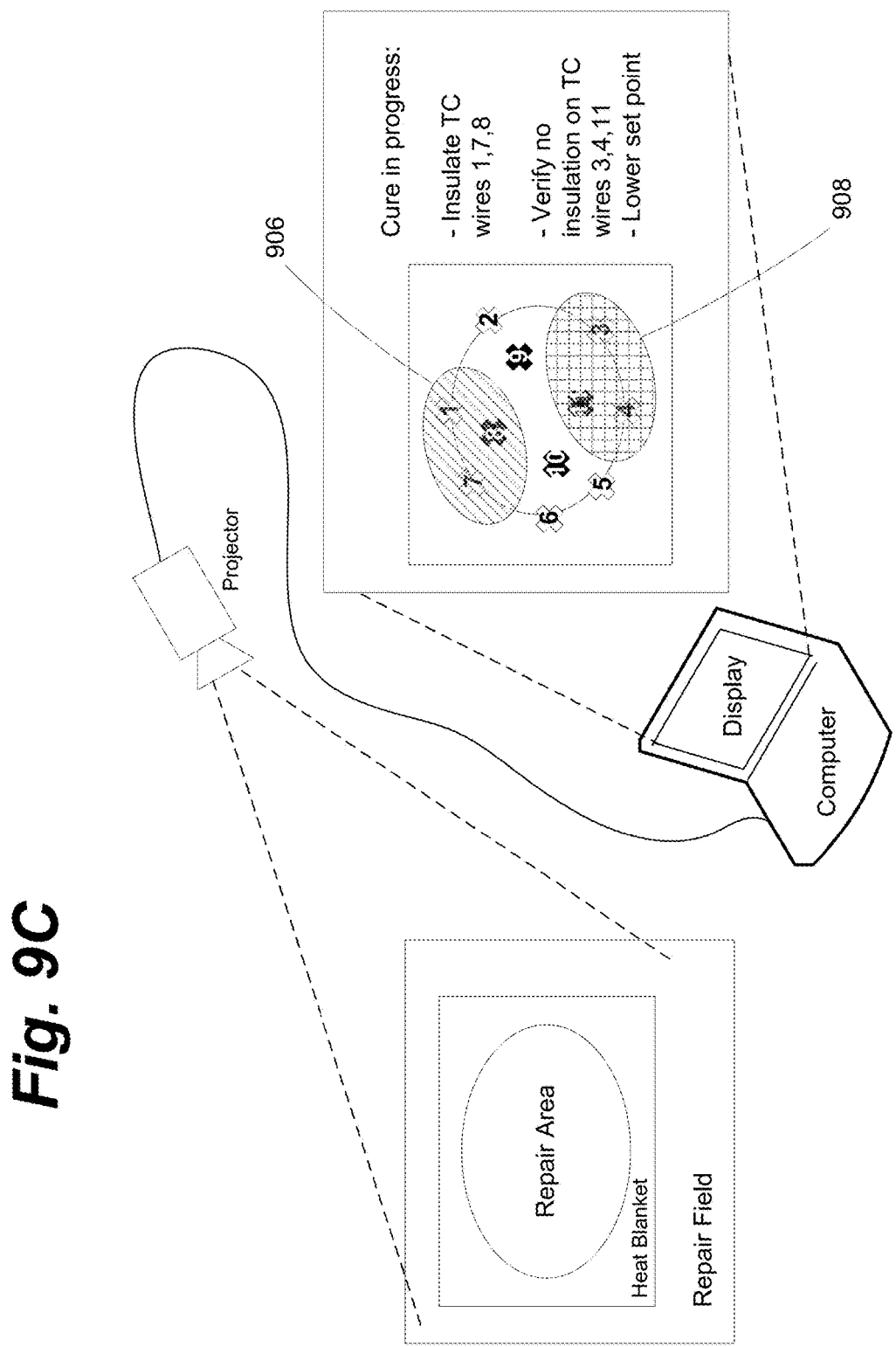

At step 550, the actual cure may begin (e.g., heating up the repair area according to the actual curing profile). At step 552, the thermal management advisor may provide recommendations (e.g., on-the-fly recommendations) regarding how to manage the repair setup during the cure. For example, the thermal management advisor may determine and display/project recommendations on how to manage hot and cold spots (e.g., TCs that are outside of acceptable ranges). In order to provide these recommendations, the thermal management advisor may analyze various pieces of information, for example, temperature readings from TCs (e.g., control TCs), the structural map, etc. FIGS. 9A, 9B and 9C show examples of how the thermal management advisor may display and/or project recommendations on how to manage hot and cold spots. For example, in FIG. 9A, the thermal management advisor may determine that TCs 1, 6, 7, 8, and 10 are running cool, and the thermal management advisor may recommend adding insulation. The thermal management advisor may display and/or project regions near particular TCs that should be insulated and/or it may display/project an area (e.g., area 902) that should be insulated to cover the cool TCs. As another example, in FIG. 9B, the thermal management advisor may determine that TCs 2, 6, 8, 9 and 10 are running hot, and the thermal management advisor may recommend that a technician verify that no insulation (or less insulation) is used in regions near particular these TCs. The thermal management advisor may display and/or project regions near particular TCs that should be un-insulated and/or it may display/project an area (e.g., area 904) that should be un-insulated to reduce the temperature at those TCs. In some situations, the thermal management advisor may recommend that the set point of the actual curing profile be lowered.

As another example, in FIG. 9C, the thermal management advisor may provide recommendations on hot and cold areas concurrently. The thermal management advisor may determine that TCs 1,7,8 are running cold, and the thermal management advisor may recommend adding insulation. The thermal management advisor may determine that TCs 3,4,11 are running hot, and may recommend that a technician verify that no insulation (or less insulation) is used in the regions near these TCs. The thermal management advisor may display and/or project particular TCs regions that should be insulated or un-insulated and/or it may display/project areas (e.g., areas 906, 908) that should be insulated or un-insulated to increase or reduce the temperatures at those TCs. In some embodiments, each time the thermal management advisor suggests a fix (e.g., more or less insulation), the thermal management advisor may receive input information from the technician, e.g., confirming that the fix was made. For each fix that is made, the thermal management advisor may save the updated repair setup configuration details. In this respect, the thermal management advisor may always maintain information about what setup or configuration was used to get all TCs within acceptable levels. This saved information may be useful, for example, if the cure has to be aborted and restarted for some reason.

At step 554, during the curing (e.g., heating), the thermal management advisor may perform other checks related to the curing conditions and the repair setup, and may provide appropriate recommendations. For example, the thermal management advisor may analyze various pieces of information, for example, temperature readings from TCs (e.g., control TCs), the structural map, and other information, to determine whether the currently-used heat blanket is performing as expected for the repair. In this respect, the thermal management advisor may continuously interrogate the heat blanket to determine whether it is adequate for the repair. To interrogate the heat blanket, the thermal management advisor may compare heat blanket power consumption readings (e.g., readings/data received from the hot bonder) to temperatures sensed by the TC's. As one example, if power consumption is outside of expected norms, the thermal management advisor may cause a warning to display and/or flash via the display and/or projector. If at some point the thermal management advisor determines that the heat blanket cannot perform as expected, thermal management advisor may display warnings and/or recommendations. Example recommendations may include checking whether the heat blanket is extended X (e.g., 2) inches beyond the TC wires and/or lowering the set point. As another example of a check that may be performed during the curing process, if the thermal management advisor determines that a TC appears to be dead or broken, the thermal management advisor may display an altered hot blanket control method. For example, if the heat blanket control method (e.g., used by the hot bonder to determine the amount of power to send to the heat blanket) uses a particular TC to control the heat blanket and that TC malfunctions, the thermal management advisor may recommend a TC to switch control to, e.g., a TC with similar thermal properties.

As another specific example of a non-insulation recommendation, the thermal management advisor may recommend that one or more locations near TCs should be heat synched, as described above. As another specific example of a non-insulation recommendation, the thermal management advisor may recommend altering the heat blanket control method (e.g., which TC(s) determine the power level sent to the heat blanket) as described above. As another specific example of a non-insulation recommendation, the thermal management advisor may recommend altering the actual curing profile used by the hot bonder, for example, to help bring all TCs within temperature tolerances. In some examples, a hot bonder may allow a technician to change the heat blanket control method and/or the hot bonder's actual curing profile on the fly, for example, without ending the cure. In some embodiments, thermal management advisor merely recommends changes that a technician can enter into the hot bonder. In other embodiments, the computer and/or thermal management advisor may communicate with the hot bonder to automatically make these changes.

If at some point, the thermal management advisor determines that an issue related to the curing process cannot be fixed (e.g., on-the-fly), the thermal management advisor may recommend that the cure to be aborted (step 556). In a similar manner, if for some reason, the recommended insulation modifications (e.g., step 552) cannot be implemented, the thermal management advisor may recommend that the cure to be aborted (step 556). By aborting cures that are not running at acceptable levels, additional damage to the structure may be avoided. At step 557, the thermal management advisor may continuously monitor temperature readings from the TCs, and may check that the TCs are within acceptable temperature levels. For example, the thermal management advisor may compare the temperature readings form the TCs to a previously entered target curing profile. If any of the TCs fall outside of acceptable levels, the thermal management advisor may recommend additional changes (e.g., at step 552 and/or step 554). If temperature readings from TCs remain within acceptable levels, the curing process may continue (step 558). At step 558, if the curing process was not aborted (e.g., step 556), the curing process may finish. For example, the curing profile may have been fully executed, rising up the set point temperature, holding that temperature for a period of time, and then cooling down. At this point, the repair patch may have been successfully cured to the structure (e.g., the aircraft component). The repair setup materials (e.g., the insulation, heat blanket, bag, etc.) may be removed, and the repaired area may be finished (e.g., sanded or polished) to make it look acceptable.

In some embodiments of the present disclosure, at various steps of the various routines described herein, the thermal management advisor may determine that a single-zone heat blanket may be inadequate to perform the repair (e.g., for surfaces with complex under structure). A single-zone heat blanket may refer to a heat blanket that heats up substantially evenly across the entire real estate of the heat blanket. Such a heat blanket may have roughly two heating options—more heat, or less heat. Some repair setups may use a more complex heating profile than can be provided by a single-zone heat blanket. The thermal management advisor may determine that a single-zone heat blanket is inadequate, for example, during the preparation steps, during a thermal survey or during the final cure.

Figure 10:
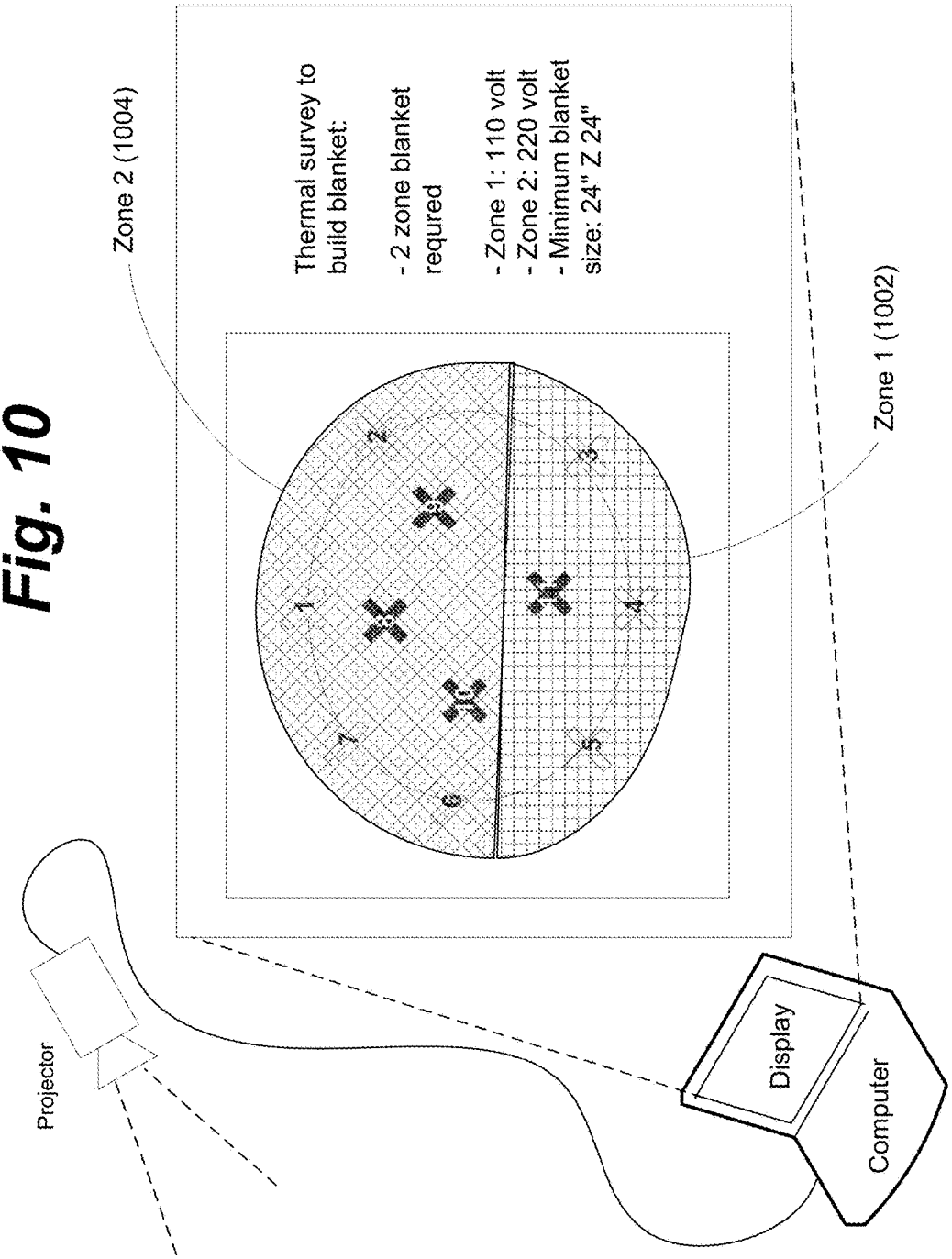
FIG. 10 depicts an example of how various items may be displayed on a display and/or projected on the repair field, in accordance with one or more embodiments of the present disclosure.

In some embodiments of the present disclosure, the thermal management advisor may include a heat blanket designer module. The heat blanket designer module may aid a technician in designing a multi-zone heat blanket that may be custom designed to appropriately heat a particular repair setup, or a similar repair setup scenario. To design a custom heat blanket, the majority of the steps explained with regard to running a thermal survey (e.g., FIG. 5B) may be performed. For example, a single zone heat blanket may be used initially, and once the thermal management advisor determines that a single zone blanket is inadequate (e.g., because some TCs cannot reach certain temperatures), the thermal management advisor may suggest one or more zones of the heat blanket that could be changed, for example, to produce a higher temperature. The thermal management advisor may analyze information received during a thermal profile (e.g., and the structural map, etc.) and may determine, display and/or project a map or diagram of the various heating zones that are suggested for a custom heat blanket. FIG. 10 shows one example of how a map or diagram of various heating zones may be displayed and/or projected. As can be seen in FIG. 10, the thermal management advisor suggested that a two-zone heat blanket should be used, and suggested that zone 1 (1002) run at 110 volts and zone 2 (1004) run at 220 volts.

By quickly determining suggestions for multiple heating zones, and displaying a precise heat blanket design diagram to a technician, the thermal management advisor may allow for faster and lower-cost designing of multi-zoned heat blankets. The use of custom designed heat blankets may improve the quality of the bonding, for example, because all the areas in the repair may meet their target cure temperature goals. The use of custom designed heat blankets may improve QA (quality assurance) checks by assuring quality in the bonding process.

In some embodiments of the present disclosure, the thermal management advisor may include a training module. The training module may facilitate classroom hands-on training for technicians, which may reduce the high cost of training hot bonder technicians. The training module may perform the majority of the steps explained with regard to running a thermal survey (e.g., FIG. 5B). For example, a technician may learn proper placement of TCs, proper selection and placement of heat blankets, proper selection and placement of insulation, etc. A technician may learn details about thermal profiles of the structures. In some embodiments, a projector (e.g., similar to projector 208 of FIG. 2) may be used to teach a technician about various steps by projecting or illuminating guides directly onto the repair area. In this respect, the thermal management advisor may provide instructions for students how to perform a repair in a step-by-step on-part fashion. In a similar respect, the thermal management advisor may provide a "pre-flight" of a repair that is about to be conducted, for example, to make sure the technician is ready for the job.

The methods, routines and solutions of the present disclosure, including the example methods and routines illustrated in the flowcharts and block diagrams of the different depicted embodiments may be implemented as software executed by a data processing system that is programmed such that the data processing system is adapted to perform and/or execute the methods, routines, techniques and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. In some alternative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved. Part or all of the computer code may be loaded into the memory of a data processing system before the data processing system executes the code.

Figure 11:
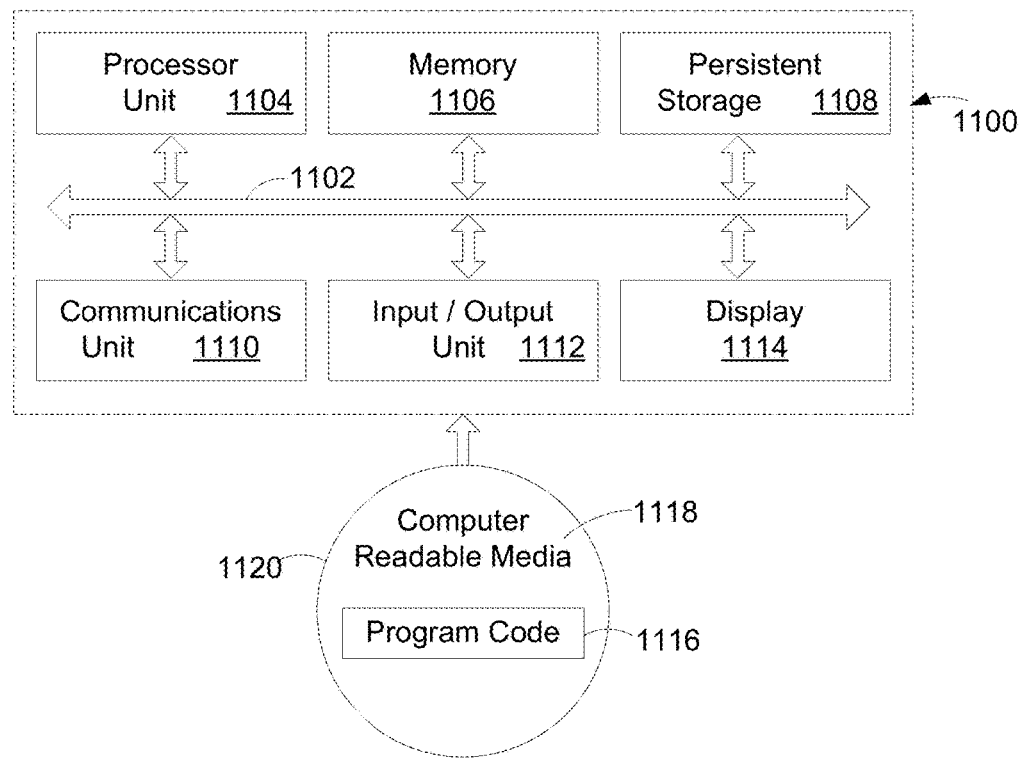
FIG. 11 depicts a block diagram of an example data processing system that may be included within a computer, according to one or more embodiments of the present disclosure.

FIG. 11 depicts a block diagram of an example data processing system 1100 that may be included within a computer (e.g., computer 202 of FIG. 2), according to one or more embodiments of the present disclosure. The data processing system 1100 may be used to execute, either partially or wholly, one or more of the methods, routines and/or solutions of the present disclosure, for example, the thermal management advisor 220 of FIG. 2. In some embodiments of the present disclosure, more than one data processing system, for example data processing systems similar to data processing system 1100, may be used to implement the methods, routines, techniques and/or solutions described herein. In the example of FIG. 11, data processing system 1100 may include a communications fabric 1102 which provides communications between components, for example a processor unit 1104, a memory 1106, a persistent storage 1108, a communications unit 1110, an input/output (I/O) unit 1112 and a display 1114. A bus system may be used to implement communications fabric 1102 and may be comprised of one or more buses such as a system bus or an input/output bus. The bus system may be implemented using any suitable type of architecture that provides for a transfer of data between different components or devices attached to the bus system.

Processor unit 1104 may serve to execute instructions (for example, a software program, e.g., a thermal management advisor) that may be loaded into the data processing system 1100, for example, into memory 1106. Processor unit 1104 may be a set of one or more processors or may be a multiprocessor core depending on the particular implementation. Processor unit 1104 may be implemented using one or more heterogeneous processor systems in which a main processor is present with secondary processors on a single chip. As another illustrative example, processor unit 1104 may be a symmetric multi-processor system containing multiple processors of the same type.

Memory 1106 may be, for example, a random access memory or any other suitable volatile or nonvolatile storage device. Memory 1106 may include one or more layers of cache memory. Persistent storage 1108 may take various forms depending on the particular implementation. For example, persistent storage 1108 may contain one or more components or devices. For example, persistent storage 1108 may be a hard drive, a solid-state drive, a flash memory or some combination of the above.

Instructions for an operating system may be located on persistent storage 1108. In one specific embodiment, the operating system may be some version of a number of known operating systems. Instructions for applications and/or programs may also be located on persistent storage 1108. These instructions may be loaded into memory 1106 for execution by processor unit 1104. For example, the methods and/or processes of the different embodiments described in this disclosure may be performed by processor unit 1104 using computer implemented instructions which may be loaded into a memory such as memory 1106. These instructions are referred to as program code, computer usable program code or computer readable program code that may be read and executed by a processor in processor unit 1104.

Display 1114 may provide a mechanism to display information to a user, for example, via a LCD or LED screen or monitor, or other type of display. It should be understood, throughout this disclosure, that the term "display" may be used in a flexible manner to refer to either a physical display such as a physical screen, or to the image that a user sees on the screen of a physical device. Input/output (I/O) unit 1112 allows for input and output of data with other devices that may be connected to data processing system 1100. Input/output devices can be coupled to the system either directly or through intervening I/O controllers. One example of a device that may be connected via the I/O unit 1112 is a projector (e.g., projector 208 of FIG. 2). One example of a device that may be connected via the I/O unit 1112 is a scanning system (e.g., scanning system 204 of FIG. 2).

Communications unit 1110 may provide for communications with other data processing systems or devices, for example, via one or more networks. Communications unit 1110 may be a network interface card. Communications unit 1110 may provide communications through the use of wired and/or wireless communications links. In some embodiments, the communications unit may include circuitry that is operable to communicate according to various wireless communication standards, for example, cellular standards, WiFi standards, Bluetooth standards and the like.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A repair management system, comprising:
multiple temperature sensors that are adapted to be placed near a repair area,
   wherein the repair area includes an area of a structure that was damaged;
a scanner that is adapted to scan a repair field of the structure,
   wherein the repair field includes the repair area and parts of structure surrounding and underlying the repair area, and
   wherein the scanner outputs structural information describing a structural composition of the repair field;

a data processing system that is coupled to the temperature sensors and the scanner, where the data processing system includes a processor that executes computer code to:
  receive the structural information from the scanner;
  generate a map of the repair area; and
  analyze the structural information to determine suggested placements of the temperature sensors near the repair area.

2. The repair management system of claim 1, wherein the processor executes computer code to display, on a screen of the data processing system, the suggested placements of the temperature sensors relative to the map of the repair area.

3. The repair management system of claim 1, wherein the scanner is a geometry scanner.

4. The repair management system of claim 1, wherein:
the scanner is adapted to scan the repair field to detect actual placements of the temperature sensors near the repair area and output temperature sensor placement information; and
the processor executes computer code to:
  receive the temperature sensor placement information from the scanner;
  generate temperature sensor indicators where each temperature sensor indicator relates to a temperature sensor as detected by the scanner, and where each of the temperature indicators is associated with a location on the map of the repair field; and
  display, on a screen of the data processing system, the temperature sensor indicators relative to the map of the repair area.

5. A repair management system, comprising:
multiple temperature sensors that are placed near a repair area,
  wherein the repair area includes an area of a structure that was damaged;
a scanning system adapted to scan the repair area; and
a data processing system that is coupled to the temperature sensors and a scanner, where the data processing system includes a processor that executes computer code to:
  generate a map of the repair area based on information received from the scanning system;
  receive temperature readings from the multiple temperature sensors; and
  analyze the map of the repair area and the temperature readings to determine one or more insulation suggestions, wherein each insulation suggestion comprises instructions to add or remove insulation within a repair field, wherein the repair field comprises the repair area.

6. The repair management system of claim 5, wherein the processor executes computer code to display, on a screen of the data processing system, the one or more insulation suggestions relative to the map of the repair area.

7. The repair management system of claim 5, wherein the scanner is a geometry scanner.

8. The repair management system of claim 5, wherein the scanning system includes a wand accessory that is adapted to detect when one of the temperature sensors is close to the wand, and wherein the wand accessory allows a user to enter, into the data processing system, a unique number for each of the temperature sensors.

9. The repair management system of claim 4, further comprising a hot bonder and associated heat blanket operably coupled with the data processing system, wherein the processor of the data processing system further executes code to control the hot bonder and associated heat blanket responsive to input from the temperature sensors.

10. The repair management system of claim 9, wherein:
the processor of the data processing system further executes code to:
  analyze the map of the repair area and the temperature sensor indicators to determine a repair size that encompasses the temperature sensors placed near the repair area; and
  determine an appropriate heat blanket size to cover the repair size; and
a size of the heat blanket corresponds with the appropriate heat blanket size.

11. The repair management system of claim 9, wherein the processor of the data processing system further executes code to:
  analyze the structural information to determine an appropriate heat blanket power supply capable of supplying power to the heat blanket to heat the repair area according to a desired heating profile; and
  supply power, corresponding with the appropriate heat blanket power supply, to the heat blanket.

12. The repair management system of claim 9, wherein the processor of the data processing system further executes code to:
  receive, as input from a user, heat blanket information that indicates a size and power of the heat blanket; and
  analyze the heat blanket information to determine whether the heat blanket is of acceptable size and power to fit and sufficiently cure the repair area.

13. The repair management system of claim 1, wherein the processor of the data processing system further executes computer code to determine at least one thermal property of the repair field and determine the suggested placements of the temperature sensors based on the at least one thermal property of the repair field.

14. The repair management system of claim 1, wherein the map of the repair area comprises an image of the repair area.

15. The repair management system of claim 1, wherein the map of the repair area comprises the structural information, variations in density, thickness, or thermal mass of the repair area.

16. The repair management system of claim 1, further comprising a projector that is coupled to the data processing system and adapted to project the suggested placements of the temperature sensors onto the repair area.

17. The repair management system of claim 5, wherein the processor of the data processing system further executes computer code to analyze the map of the repair area and the temperature readings from the multiple temperature sensors to determine the instructions in response to a determination that one or more of the temperature readings is not within an acceptable temperature range based on a location of a corresponding one or more of the multiple temperature sensors within the repair field.

18. The repair management system of claim 5, further comprising a projector that is coupled to the data processing system and adapted to project the one or more insulation suggestions onto the repair field.

19. The repair management system of claim 5, wherein the instructions to add or remove insulation within the repair field comprises instructions to add to or remove insulation from at least one temperature sensor of the multiple temperature sensors or from an insulation area within the repair field.

20. A repair management system for repairing a repair area that includes an area of a structure that was damaged, comprising:
- a scanner that is adapted to scan a repair field of the structure,
  - wherein the repair field includes the repair area and parts of structure surrounding and underlying the repair area, and
  - wherein the scanner outputs structural information describing a structural composition of the repair field;
- a data processing system that is coupled to the scanner, where the data processing system includes a processor that executes computer code to:
  - receive the structural information from the scanner;
  - generate a map of the repair area based in the structural information; and
  - analyze the structural information to determine suggested placements of temperature sensors near the repair area; and
- temperature sensors placed in the suggested placements;
- wherein the processor of the data processing system further executes computer code to:
  - receive temperature readings from the temperature sensors; and
  - analyze the map of the repair area and the temperature readings to determine one or more insulation suggestions, wherein each insulation suggestion comprises instructions to add or remove insulation within the repair field.

* * * * *